United States Patent
Kojima

(10) Patent No.: US 7,548,635 B2
(45) Date of Patent: Jun. 16, 2009

(54) METHOD AND APPARATUS FOR IMAGE PROCESSING CAPABLE OF PREVENTING UNAUTHORIZED REPRODUCTION OF AN IMAGE

(75) Inventor: Hideyuki Kojima, Hiratsuka (JP)

(73) Assignee: Ricoh Company, Ltd., Tokyo (JP)

( * ) Notice: Subject to any disclaimer, the term of this patent is extended or adjusted under 35 U.S.C. 154(b) by 951 days.

(21) Appl. No.: 10/942,980

(22) Filed: Sep. 17, 2004

(65) Prior Publication Data

US 2005/0094183 A1 May 5, 2005

(30) Foreign Application Priority Data

Sep. 17, 2003 (JP) .............. 2003-323870

(51) Int. Cl.
*G06K 9/00* (2006.01)
(52) U.S. Cl. .............. 382/112; 358/426.02; 235/462.46
(58) Field of Classification Search ................ 382/100, 382/112; 358/1.1, 3.28, 426.02, 436, 437, 358/468, 424, 425, 474; 235/462.46, 472.02, 235/492
See application file for complete search history.

(56) References Cited

U.S. PATENT DOCUMENTS

| 6,086,706 | A | * | 7/2000 | Brassil et al. ............... 156/277 |
| 6,109,526 | A | * | 8/2000 | Ohanian et al. ........ 235/462.45 |
| 6,710,891 | B1 | * | 3/2004 | Vraa et al. ................. 358/1.12 |
| 6,766,945 | B2 | * | 7/2004 | Kia et al. ..................... 235/380 |
| 6,819,446 | B1 | * | 11/2004 | Ogawa et al. .............. 358/1.15 |
| 7,048,194 | B2 | * | 5/2006 | Minami et al. .............. 235/492 |
| 2002/0170973 | A1 | * | 11/2002 | Teraura ...................... 235/492 |

FOREIGN PATENT DOCUMENTS

| EP | 1 076 316 A2 | 2/2001 |
| GB | 2 358 115 A | 7/2001 |
| JP | 6-54186 | 2/1994 |
| JP | 9-104189 | 4/1997 |
| JP | 2001-160117 | 6/2001 |
| JP | 2002-190911 | 7/2002 |
| JP | 2002-337426 | 11/2002 |
| JP | 2003-32488 | 1/2003 |
| JP | 2003-50525 | 2/2003 |
| WO | WO 03/077196 A1 | 9/2003 |

* cited by examiner

*Primary Examiner*—Anand Bhatnagar
(74) *Attorney, Agent, or Firm*—Oblon, Spivak, McClelland, Maier & Neustadt, P.C.

(57) ABSTRACT

An image reading apparatus including a copy protection control apparatus including a radio frequency tag data communicating mechanism configured to receive predetermined radio frequency tag data transmitted from a radio frequency tag attached to an object material to be reproduced. A copy authorization determining mechanism determines whether reproduction of the object material is authorized based on the radio frequency tag data, and an image data reading controlling mechanism controls an image data reading mechanism and an image data outputting mechanism to perform one of a copy output process and a copy prevention process according to a result of determination performed by the copy authorization determining mechanism.

31 Claims, 24 Drawing Sheets

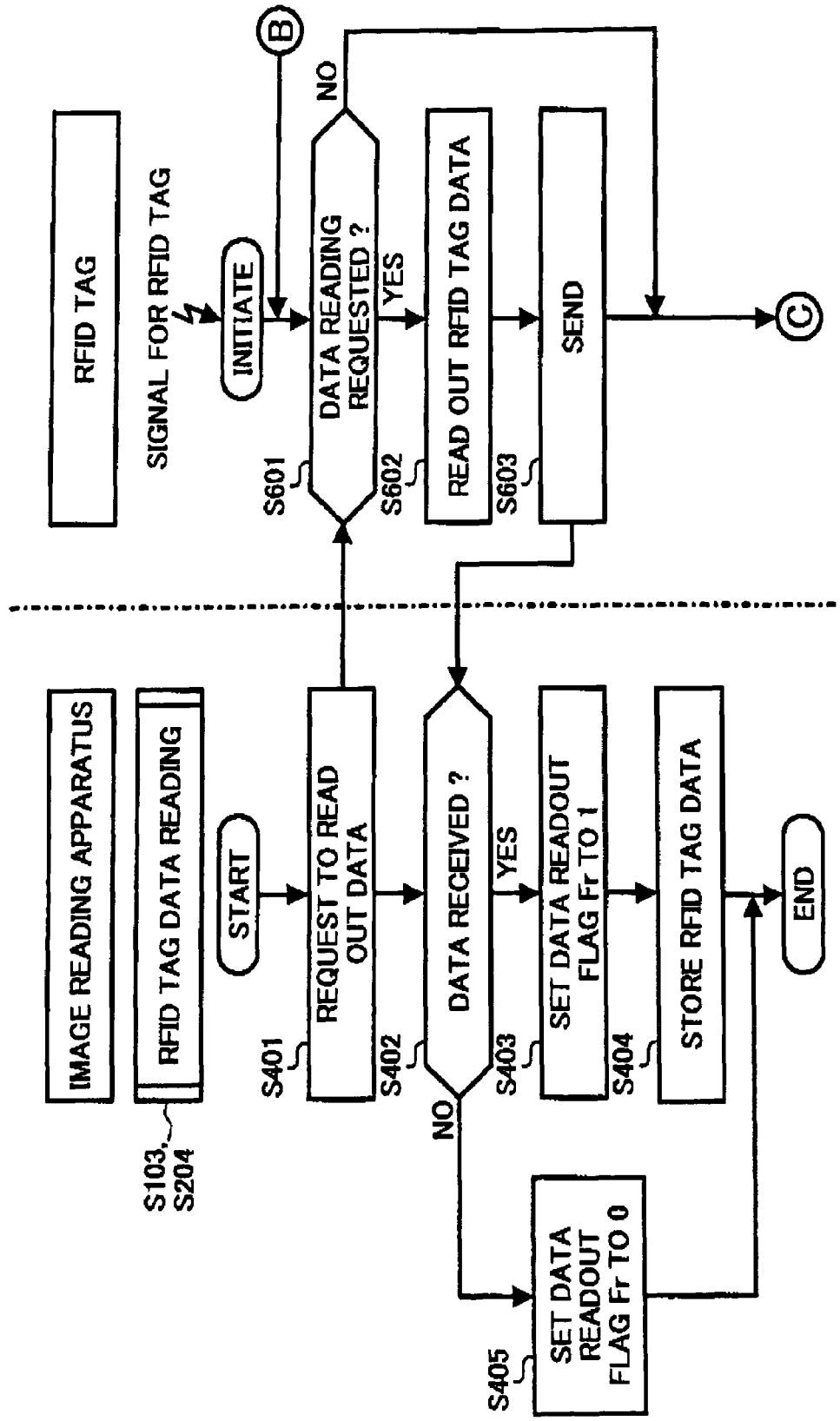

METHOD AND APPARATUS FOR IMAGE PROCESSING CAPABLE OF PREVENTING UNAUTHORIZED REPRODUCTION OF AN IMAGE

BACKGROUND OF THE INVENTION

1. Field of the Invention

The present invention relates to a method and apparatus for image processing. In particular, the present invention relates to a method and apparatus for image processing capable of preventing unauthorized reproduction of an image by determining levels of significance in confidentiality and illegitimacy pertinent to the image using a radio frequency tag.

2. Description of the Related Art

An image reading apparatus reads an original document, which is hereinafter referred to as an "object material", and obtains image data of the object material. The thus obtained image data is used in a variety of different ways. For example, in a case of copiers, the image data is reproduced as an image on a recording medium such as a recording sheet. In a case of digital systems, the image data is transferred from a scanner to a host apparatus such as a personal computer and is printed on a recording medium with a color printer connected to the host apparatus. In a case of a facsimile machine, the image data is transmitted via a communication system or a network to a different facsimile machine located at a remote site so as to be output in a hard copy form at the different facsimile machine.

In a case where an object material to be read by the image reading apparatus is a copy-prohibited document such as a banknote or a valuable paper, the image data obtained therefrom may be misused as data to generate a forged copy. In particular, the image data obtained by reading banknotes or valuable papers may be printed on recording sheets to be used as forged banknotes and forged valuable papers. In a case where a passbook having a page with specific seal impression is read to obtain image data of the page, the image data of the specific seal impression may digitally be cut using an image processing application to print a forged seal impression in color onto a sheet for applying a deposit withdrawal so that the deposit may illegally be withdrawn from a bank account of the passbook.

To eliminate the above-described misuses, the image reading apparatus needs to prevent counterfeiting of the object material. For example, the image processing apparatus may leave an object material unread or delete the image data obtained when the object material is found out to be a copy-prohibited document such as a banknote or a valuable paper. In this case, the image reading apparatus needs to determine whether or not the object material set in the image reading apparatus is the document which is prohibited from being copied.

The copy-prohibited document may be recognized using a determination method based on image comparison in which the image data obtained through the image reading apparatus is compared with pattern data previously stored in the image reading apparatus.

Some background image reading apparatuses employ a technique which uses a determination method based on image comparison. The technique focuses on detection of a shadowing printed on a banknote, for example, so that the banknote can be recognized with a relatively small amount of pattern data.

However, the image reading apparatus generally handles many kinds of object materials including not only those without a shadowing but also those with a shadowing. In a case of handling the object materials without a shadowing, an amount of pattern data will be increased and therefore, the image reading apparatus needs to have a greater amount of memory to previously store the pattern data for image comparison with various object materials to allow or disallow its copying. Further, the image reading apparatus carrying out the determination method based on image comparison may impose excessive load on image comparison. In addition, the image reading apparatus may need to have high performance image processing circuits for carrying out the above-described determination method, which results in an increase in production costs.

Further, when the determination method based on image comparison alone is carried out, the image reading apparatus tends to misidentify a non-copy-prohibited document as a copy-prohibited document when the former is similar to the latter.

In addition, the determination method based on image comparison is not applicable to an object material including pattern data that is not previously stored in the memory of the image reading apparatus. For example, when a new banknote is published after a release of the image reading apparatus, the new banknote cannot be determined as "copy disallowed".

Even though it is desirable to determine copy permission before reading the object material, the determination method based on image comparison recognizes its pattern data after reading the image data of the object material. In addition, anti-counterfeit countermeasures of the object material determined as "copy disallowed" have not substantially been made.

SUMMARY OF THE INVENTION

The present invention has been made in view of the above-described circumstances.

An object of the present invention is to provide an image reading apparatus capable of preventing reproduction of copy-prohibited documents by determining copy permission and performing a copy prevention process in communication with a radio frequency tag.

Another object of the present invention is to provide a copy permission determining device included in the above-described image reading apparatus and capable of generally and surely determining the copy permission at low cost.

Another object of the present invention is to provide a scanner that can appropriately prevent counterfeiting according to determination results obtained by the copy permission determining apparatus.

Another object of the present invention is to provide a facsimile machine that can appropriately prevent counterfeiting according to determination results obtained by the copy permission determining apparatus.

Another object of the present invention is to provide a copier that can appropriately prevent counterfeiting according to determination results obtained by the copy permission determining apparatus.

Another object of the present invention is to provide a multi-functional image forming apparatus that can appropriately prevent counterfeiting according to determination results obtained by the copy permission determining apparatus.

A novel image processing apparatus includes a copy protection control apparatus, an image data reading mechanism, an image data outputting mechanism, and an image data reading controlling mechanism. The copy protection control apparatus includes a radio frequency tag data communicating mechanism configured to receive predetermined radio frequency tag data transmitted by radio from a radio frequency tag attached to an object material, and a copy authorization determining mechanism configured to determine whether reproduction of the object material is authorized, based on the radio frequency tag data received by the radio frequency tag data communicating mechanism. The image data reading mechanism is configured to read the object material and obtain image data of the object material. The image data outputting mechanism is configured to output the image data in a predetermined output mode. The image data reading controlling mechanism is configured to control the image data reading mechanism and the image data outputting mechanism to perform one of a copy output process and a copy prevention process according to a result of determination performed by the copy authorization determining mechanism.

The image data reading controlling mechanism may cause the image data reading mechanism to read and obtain the image data of the object material and the image data outputting mechanism to output the image data when the copy authorization determining mechanism determines that reproduction of the object material is authorized, and may perform one of a plurality of predetermined copy prevention processes when the copy authorization determining mechanism determines that reproduction of the object material is not authorized.

The plurality of predetermined copy prevention processes performed by the image data reading controlling mechanism may include a process in which the image data reading mechanism refrains from reading of the object material, regardless of an input of a predetermined instruction for starting a reading operation of the object material.

The plurality of predetermined copy prevention processes performed by the image data reading controlling mechanism may include a process in which the image data reading mechanism suspends and stops a reading operation of the object material and the image data outputting mechanism refrains from an outputting operation of the image data of the object material.

The plurality of predetermined copy prevention processes performed by the image data reading controlling mechanism may include a process in which the image data outputting mechanism refrains from outputting the image data of the object material obtained and stored in a memory by the image data reading mechanism.

The plurality of predetermined copy prevention processes performed by the image data reading controlling mechanism may include a process in which the image data reading controlling mechanism performs a predetermined image processing to prevent counterfeiting over the image data obtained and stored in a memory by the image data reading mechanism, and the image data outputting mechanism outputs the image data that has undergone the predetermined image processing.

The copy authorization determining mechanism may determine whether reproduction of the object material is authorized based on the radio frequency tag data received by the radio frequency tag communicating mechanism and based on a result of a predetermined image recognition processing with respect to the image data of the object material obtained and stored in the memory by the image data reading mechanism.

The copy authorization determining mechanism may determine whether reproduction of the object material is authorized based on the radio frequency tag data received by the radio frequency tag communicating mechanism and based on a result of a predetermined image recognition processing with respect to the image data of the object material obtained and stored in the memory by the image data reading mechanism.

The plurality of predetermined copy prevention processes performed by the image data reading controlling mechanism may include a process in which the image reading controlling mechanism overwrites to delete the image data stored in the memory when the copy authorization determining mechanism determines that reproduction of the object material from which the image data is obtained and stored in the memory by the image data reading mechanism is unauthorized.

The image processing apparatus may further include a copy unauthorization notifying mechanism configured to output a notification indicating reproduction of the object material is unauthorized in a predetermined user-recognizable form when the copy authorization determining mechanism determines that reproduction of the object material is unauthorized.

The image data reading mechanism may read the object material placed on a contact glass through a moving member which reciprocates under the contact glass in a sub-scanning direction, and the radio frequency data communicating mechanism may include a transmitter and a receiver, at least one of which is disposed on the moving member.

The radio frequency tag data communicating mechanism may receive the radio frequency tag data from the radio frequency tag each time the moving member moves a substantially constant distance in a sub-scanning direction.

The image processing apparatus may further include an identification data writing mechanism configured to send and write identification data of the apparatus previously stored in a memory to the radio frequency tag attached to the object material when the copy authorization determining mechanism determines that reproduction of the object material from which the image data is obtained and stored in the memory by the image data reading mechanism is unauthorized.

A novel method of image forming includes the steps of placing an object material on a contact glass of an image reading apparatus, retrieving predetermined radio frequency tag data sent by radio from a radio frequency tag attached to the object material, determining copy permission to copy the object material, based on the radio frequency tag data retrieved by the retrieving step, and controlling the image processing apparatus to perform one of a copy output process and a copy prevention process according to a result of the copy permission determined by the determining step.

The controlling step may further include the steps of reading the image data of the object material when the determining step determines positively the copy permission, that is, "copy allowed", and outputting the image data.

The controlling step may further include the steps of performing one of a plurality of predetermined copy prevention processes when the determining step determines negatively the copy permission, that is, "copy disallowed".

The plurality of predetermined copy prevention processes performed by the controlling step may include a process in which the reading step refrains from reading the image data of the object material, regardless of an input of a predetermined instruction to start an reading operation of the image data of the object material.

The plurality of predetermined copy prevention processes performed by the reading step may include a process in which the reading step suspends and stops the reading operation of the image data of the object material and the outputting step refrains from an outputting operation of the image data of the object material.

The plurality of predetermined copy prevention processes performed by the controlling step may include a process in which the outputting step refrains from outputting the image data of the object material read and stored in a memory by the reading step.

The plurality of predetermined copy prevention processes performed by the controlling step may include a process in which the controlling step performs a predetermined image processing to prevent counterfeiting over the image data read and stored in a memory by the reading step, and the outputting step outputs the image data.

The determining step may determine the copy permission to copy the object material based on the radio frequency tag data retrieved by the retrieving step and based on a result of a predetermined image recognition processing with respect to the image data of the object material obtained and stored in the memory by the reading step.

The determining step may determine the copy permission to copy the object material based on the radio frequency tag data retrieved by the retrieving step and based on a result of a predetermined image recognition processing with respect to the image data of the object material obtained and stored in the memory by the reading step.

The plurality of predetermined copy prevention processes performed by the controlling step may include a process in which the controlling step overwrites to delete the image data stored in a memory when the image data is obtained from the object material and stored in the memory by the reading step and the determining step determines negatively the copy permission as a "copy disallowed".

The novel method may further include the step of outputting a notification indicating "copy disallowed" in a predetermined user-recognizable form when the determining step determines negatively the copy permission to copy the object material, that is, "copy disallowed".

The reading step may read the object material placed on the contact glass through a moving member which reciprocates under the contact glass in a sub-scanning direction, and at least one of a transmitter and a receiver used by the retrieving step may be disposed on the moving member.

The retrieving step may retrieve the radio frequency tag data from the radio frequency tag each time the moving member moves a substantially constant distance.

The method may further include the step of writing identification data previously stored in a memory to the radio frequency tag attached to the object material when the determining step determines negatively the copy permission, that is, "copy disallowed".

In one exemplary embodiment, a novel copy protection control apparatus includes a radio frequency tag data communicating mechanism configured to receive predetermined radio frequency tag data transmitted by radio from a radio frequency tag attached to an object material, and a copy authorization determining mechanism configured to determine whether reproduction of the object material is authorized, based on the radio frequency tag data received by the radio frequency tag data communicating mechanism.

The radio frequency tag data may include predetermined copy authorization data and the copy authorization determining mechanism may determine that the reproduction of the object material is not authorized when the predetermined copy authorization data represents unauthorization and that the reproduction of the object material is authorized in cases other than the case when the predetermined copy authorization data represents unauthorization.

The radio frequency tag data may include predetermined object-material type data, and the copy authorization determining mechanism may determine that the reproduction of the object material is not authorized when the predetermined object-material type data represents unauthorization and that the reproduction of the object material is authorized in cases other than the case when the predetermined object-material type data represents unauthorization.

The radio frequency tag data may include predetermined copy protection rank data, and the copy authorization determining mechanism may determine that the reproduction of the object material is not authorized when the predetermined copy protection rank data represents unauthorization and that the reproduction of the object material is authorized in cases other than the case when the predetermined copy protection rank data represents unauthorization.

The radio frequency tag data may include predetermined serial number data, and the copy authorization determining mechanism may determine that the reproduction of the object material is not authorized when the predetermined serial number data represents unauthorization and that the reproduction of the object material is authorized in cases other than the case when the predetermined serial number data represents unauthorization.

The copy authorization determining mechanism may determine that the reproduction of the object material authorized when the radio frequency tag data communicating mechanism does not receive the radio frequency tag data.

The radio frequency tag data communicating mechanism may transmit output radio frequency tag data at a radio frequency transmitting level at which none of the radio frequency tags disposed outside an area between first and second positions reacts but any of the radio frequency tags disposed on and inside the area between the first and second positions reacts. The first position may be a position at which the object material is read and the second position may be a position at which the radio frequency tag data communicating mechanism is located.

The radio frequency tag data communicating mechanism may adjust a radio frequency receiving sensitivity to a level at which none of the radio frequency tags disposed outside an area between first and second positions reacts but any of the radio frequency tags disposed on and inside the area between the first and second positions reacts. The first position may be a position at which the object material is read and the second position may be a position at which the radio frequency tag data communicating mechanism is located.

The radio frequency tag data communicating mechanism may include a transmitter for transmitting the output radio frequency tag data and a receiver for receiving the predetermined radio frequency tag data and may have a radio frequency directivity in a direction from a position of at least one of the transmitter and the receiver of the radio frequency tag data communicating mechanism to the object material which is set to be read.

A novel method of copy permission includes the steps of receiving predetermined radio frequency tag data sent by radio from a radio frequency tag attached to an object material, and determining copy permission to copy the object material, based on the radio frequency tag data retrieved by the retrieving step.

The radio frequency tag data may include predetermined copy authorization data, and the determining step may determine that the reproduction of the object material is not authorized when the predetermined copy authorization data represents unauthorization and that the reproduction of the object material is authorized in cases other than the case when the predetermined copy authorization data represents unauthorization.

The radio frequency tag data may include predetermined object-material type data, and the determining step may determine that the reproduction of the object material is not authorized when the predetermined object-material type data represents unauthorization and that the reproduction of the object material is authorized in cases other than the case when the predetermined object-material type data represents unauthorization.

The radio frequency tag data may include predetermined copy protection rank data, and the determining step may determine that the reproduction of the object material is not authorized when the predetermined copy protection rank data represents unauthorization and that the reproduction of the object material is authorized in cases other than the case when the predetermined copy protection rank data represents unauthorization.

The radio frequency tag data may include predetermined serial number data, and the determining step may determine that the reproduction of the object material is not authorized when the predetermined serial number data represents unauthorization and that the reproduction of the object material is authorized in cases other than the case when the predetermined serial number data represents unauthorization.

The determining step may determine that the reproduction of the object material authorized when the receiving step does not receive the radio frequency tag data.

The receiving step may transmit output radio frequency tag data at a radio frequency transmitting level at which none of the radio frequency tags disposed outside an area between first and second positions reacts but any of the radio frequency tags disposed on and inside the area between the first and second positions reacts. The first position may be a position at which the object material is read and the second position may be a position at which the receiving step performs.

The receiving step may adjust a radio frequency receiving sensitivity to a level at which none of the radio frequency tags disposed outside an area between first and second positions reacts but any of the radio frequency tags disposed on and inside the area between the first and second positions reacts. The first position may be a position at which the object material is read and the second position may be a position at which the receiving step performs.

The receiving step may include a transmitter for transmitting the output radio frequency tag data and a receiver for receiving the predetermined radio frequency tag data and have a radio frequency directivity in a direction from a position of at least one of the transmitter and the receiver of the receiving step to the object material which is set to be read.

In one exemplary embodiment, a novel scanner includes a radio frequency tag data communicating mechanism configured to receive predetermined radio frequency tag data transmitted by radio from a radio frequency tag attached to an object material, a copy authorization determining mechanism configured to determine whether reproduction of the object material is authorized, based on the radio frequency tag data received by the radio frequency tag data communicating mechanism, an image data reading mechanism configured to read the object material and obtain image data of the object material, an image data outputting mechanism configured to output the image data in a predetermined output mode and to transfer the image data to an external data processing apparatus, and an image data reading controlling mechanism configured to control the image data reading mechanism and the image data outputting mechanism to perform one of a copy output process and a copy prevention process according to a result of determination performed by the copy authorization determining mechanism.

In one exemplary embodiment, a novel facsimile machine includes a radio frequency tag data communicating mechanism configured to receive predetermined radio frequency tag data transmitted by radio from a radio frequency tag attached to an object material, a copy authorization determining mechanism configured to determine whether reproduction of the object material is authorized, based on the radio frequency tag data received by the radio frequency tag data communicating mechanism, an image data reading mechanism configured to read the object material and obtain image data of the object material, an image data outputting mechanism configured to output the image data in a predetermined output mode and to transfer the image data to an external data processing apparatus via a predetermined network, and an image data reading controlling mechanism configured to control the image data reading mechanism and the image data outputting mechanism to perform one of a copy output process and a copy prevention process according to a result of determination performed by the copy authorization determining mechanism.

In one exemplary embodiment, a novel copier includes a radio frequency tag data communicating mechanism configured to receive predetermined radio frequency tag data transmitted by radio from a radio frequency tag attached to an object material, a copy authorization determining mechanism configured to determine whether reproduction of the object material is authorized, based on the radio frequency tag data received by the radio frequency tag data communicating mechanism, an image data reading mechanism configured to read the object material and obtain image data of the object material, an image data outputting mechanism configured to output the image data in a predetermined output mode and to print the image data on a recording medium, and an image data reading controlling mechanism configured to control the image data reading mechanism and the image data outputting mechanism to perform one of a copy output process and a copy prevention process according to a result of determination performed by the copy authorization determining mechanism.

In one exemplary embodiment, a novel multi-functional image forming apparatus includes a radio frequency tag data communicating mechanism configured to receive predetermined radio frequency tag data transmitted by radio from a radio frequency tag attached to an object material, a copy authorization determining mechanism configured to determine whether reproduction of the object material is authorized, based on the radio frequency tag data received by the radio frequency tag data communicating mechanism, an image data reading mechanism configured to read the object material and obtain image data of the object material, an image data outputting mechanism configured to output the image data in a predetermined output mode, and an image data reading controlling mechanism configured to control the image data reading mechanism and the image data outputting mechanism to perform one of a copy output process and a copy prevention process according to a result of determination performed by the copy authorization determining mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 16A and 16B are flowcharts showing detailed operations of a RFID tag data reading process and a copy operation data writing process performed by the image reading apparatus, and a RFID tag responding process performed by the RFID tag communicating with the image reading apparatus.

DETAILED DESCRIPTION OF THE PREFERRED EMBODIMENTS

Figure 1:
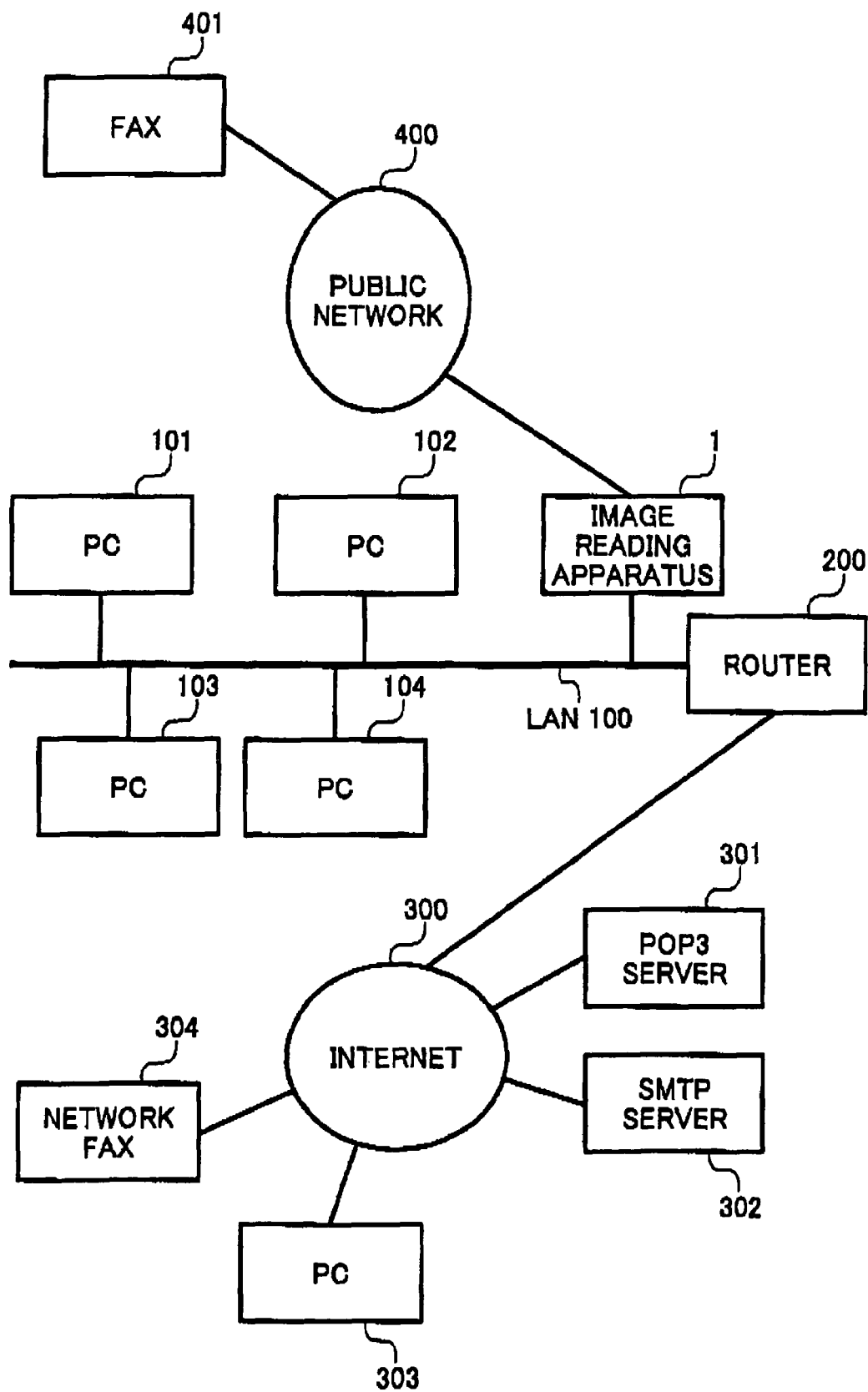
FIG. 1 is a schematic structure of a system including an image reading apparatus and related units according to an exemplary embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, preferred embodiments of the present invention are described.

Referring to FIG. 1, a system structure of an image reading apparatus 1 and its related units according to an exemplary embodiment of the present invention is described.

In FIG. 1, the system mainly includes the image reading apparatus 1, a local area network (LAN) 100, a router 200, the Internet 300, and a public network 400.

In FIG. 1, the image reading apparatus 1 is connected via a LAN 100 to personal computers (PC) 101, 102, 103 and 104. When the PCs issue, via the LAN 100, instructions to start reading an original document, the image reading apparatus 1 reads image data of the original document and transfers the image data via the LAN 100 back to the PCs. In this case, the image reading apparatus 1 works as a scanner.

The image reading apparatus 1 also works as a facsimile machine. After reading the image data of the original document by itself, the image reading apparatus 1 transmits the image data via a public network 400 to a facsimile machine 401 having a G3 protocol. The image reading apparatus 1 also receives image data from the facsimile machine 401 via the public network 400.

The image reading apparatus 1 also performs as a network facsimile machine. After reading the image data, the image reading apparatus 1 performs a facsimile transmission for sending in a form of multipurpose Internet mail extension (MIME) type e-mail via a simple mail transfer protocol (SMTP) server 302 to a PC 303 and a network facsimile machine 304 through the Internet 300, and for receiving in a form of MIME-type e-mail via a post office protocol 3 (POP3) server 301 from the PC 303 and the network facsimile machine 304 through the Internet 300.

The image reading apparatus 1 also performs as a copier. After reading the image data by itself, the image reading apparatus 1 prints out the image data.

The image reading apparatus 1 also works as a multi-functional image forming apparatus having a plurality of image processing functions working as a scanner, copier, facsimile machine, and so forth.

Figure 2:
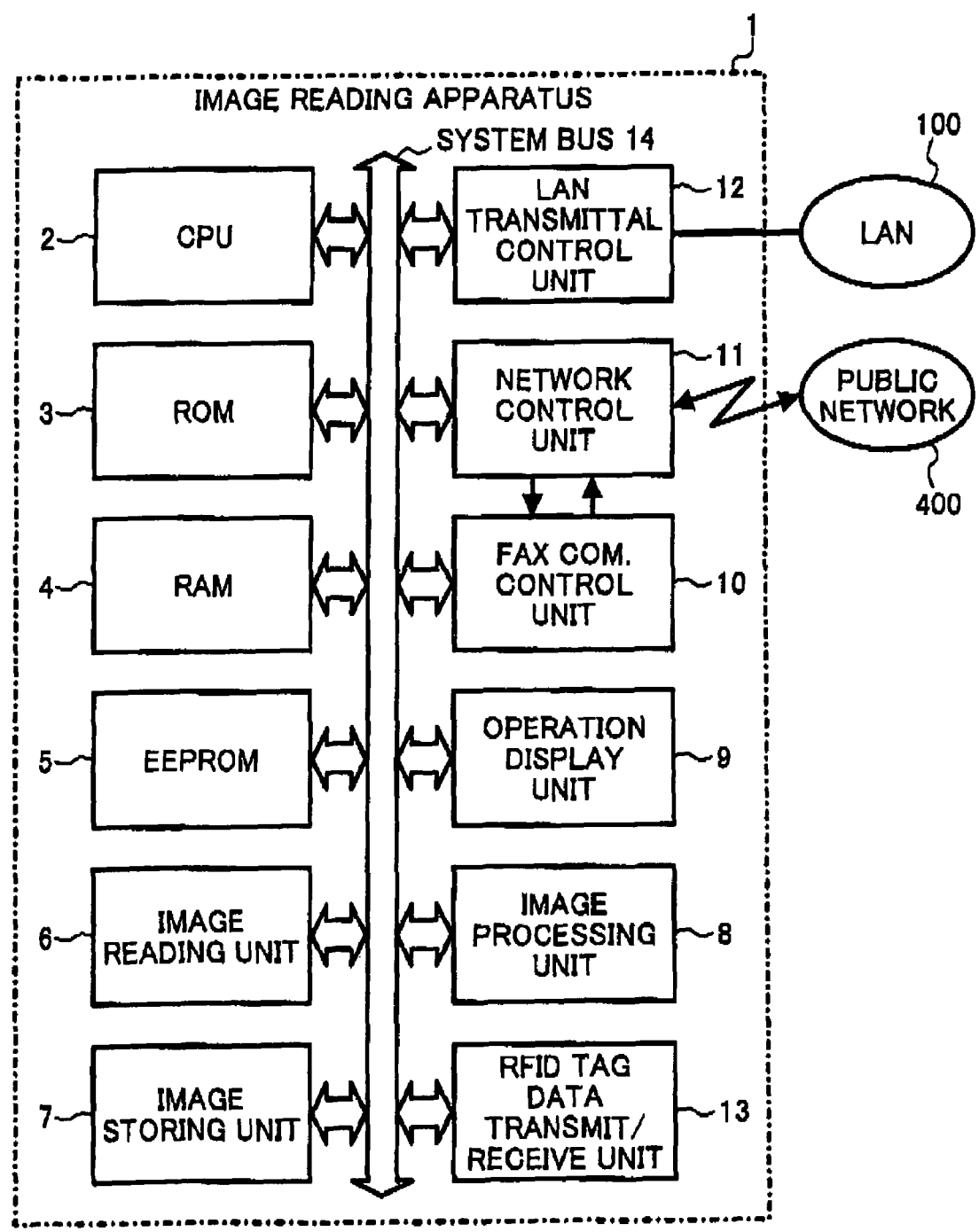
FIG. 2 is a block diagram of the image reading apparatus according to the exemplary embodiment of the present invention.

Referring to FIG. 2, a block diagram of the image reading apparatus 1 according to an exemplary embodiment of the present invention is described.

In FIG. 2, the image reading apparatus 1 includes a central processing unit (CPU) 2, a read only memory (ROM) 3, a random access memory (RAM) 4, an electrically erasable and programmable read only memory (EEPROM) 5, an image reading unit 6, an image storing unit 7, an image processing unit 8, an operation display unit 9, a facsimile communication control unit 10, a network control unit 11, a LAN transmittal control unit 12, and a radio frequency identification (RFID) tag data communication unit 13. The above-described units of the image reading apparatus 1 are connected via a system bus 14. The network control unit 11 communicates with the public network 400, and the LAN transmittal control unit 12 runs under the LAN 100.

The CPU 2 uses the RAM 4 as a work area, controls various units based on control programs written in the ROM 3, processes data related to the various units, and performs protocol controls.

The ROM 3 stores the control programs for the CPU 2, as described above, and fixed data.

The RAM 4 is used by the CPU 2, as described above, as its work area.

The EEPROM 5 stores various data necessary for operating the image reading apparatus 1 and keeps the data available even when a power source of the image reading apparatus 1 is turned off.

The image reading unit 6 reads the object material set in the image reading apparatus 1 to obtain the image data of the object material. The image reading unit 6 works as an image data reading mechanism.

The image storing unit 7 stores the image data to output the image data onto an image recording medium such as a recording sheet.

The image processing unit 8 performs various processes such as a gray scale processing of the image data read by the image reading unit 6. The operation display unit 8 also has a screen such as a liquid crystal display screen to display operational conditions of the image reading apparatus 1 and various messages related to the operations to inform the users.

The operation display unit 9 has operation keys arranged thereon to interface operation instructions input by users.

The facsimile communication control unit 10 has a serial interface function and a facsimile modem function. The serial interface function builds a high-level data link control (HDLC) frame to send data transferred by the CPU 2 and retrieves the data from the HDLC frame. The facsimile modem function modulates and demodulates G3 facsimile control signals, such as a called station identification (CSI) signal and a digital identification signal (DSI), and image data after the signals and the image data are framed and performs facsimile transmission. In particular, the facsimile modem function includes functions performed by a slow modem, such as V.21 modem, for exchanging G3 facsimile control signals complying with International Telecommunication Union (ITU) Recommendation T.30 and functions performed by a fast modem, such as V. 17, V.33, V.34, V.29 and V.27ter modems, for mainly exchanging image data. The facsimile communication control unit 10 also generates and sends dual tone modulation frequency (DTMF) signals corresponding to destination telephone numbers.

The network control unit 11 electrically interfaces the image reading apparatus 1 with the public network 400. The network control unit 11 controls connections with a subscriber's line in the public network 400, such as open and close of a direct current loop, detections of polarity reversal of the subscriber's line, line release, dial tones, tone signals such as a busy tone, and call signals. The network control unit 11 also includes an automatic sending and receiving function.

The LAN transmittal control unit 12 is connected with the Ethernet LAN 100 that is connected to the Internet 300 via a router 200 relaying IP packets.

The LAN transmittal control unit 12 converts a packet, which is created by using a protocol higher than transmission control protocol/Internet protocol (TCP/IP) or user datagram protocol/Internet protocol (UDP/IP) executed by the CPU 2, to an electric signal and sends the electric signal to the LAN 100. The LAN transmittal control unit 12 also obtains the packet originally created by using the protocol higher than TCP/IP or UDP/IP from the electric signal received via the LAN 100 and transmits the packet to an IP protocol higher than the above-described protocol.

The RFID tag data communication unit 13 works as a radio frequency tag reader and writer corresponding to a radio frequency tag data retrieving mechanism and a local apparatus identification (ID) data writing mechanism, and communicates, under a control of the CPU 2, with a radio frequency identification (RFID) tag 30 attached to the object material set in the image reading unit 6. The RFID tag data communication unit 13 reads RFID tag data from the RFID tag 30 and writes local apparatus identification (ID) data. The RFID tag 30, the RFID tag data, and the local apparatus ID data will be described later. The RDIF tag 30 is used in the present invention to represent various radio frequency tags.

The system bus 14 is a group of signal lines mainly including a data bus, address bus, control bus, and interruption signal line, which are used to exchange data between the above-described units.

The image storing unit 7, the LAN transmittal control unit 12, and the facsimile communication unit 10 correspond to an image data outputting mechanism for performing a copy output process to output the image data using one of respective output modes.

Figure 3:
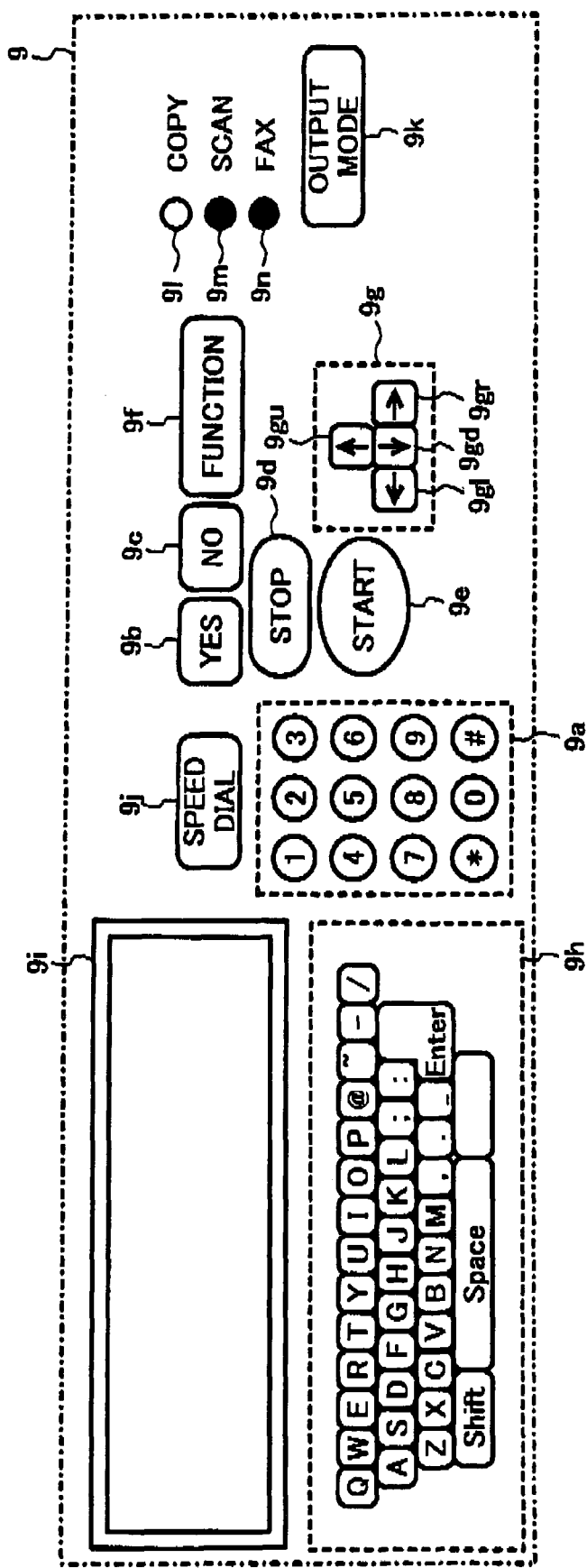
FIG. 3 is a front elevation view of an operation display of the image reading apparatus.

Referring to FIG. 3, a layout of an operation display unit 9 of the image reading apparatus 1 is described.

The operation display unit 9 includes a ten key panel 9a, a [YES] key 9b, a [NO] key 9c, a [STOP] key 9d, a [START] key 9e, a [FUNCTION] key 9f, a group of arrow keys 9g, a keyboard 9h, a screen 9i, a [SPEED DIAL] key 9j, an [OUTPUT MODE] key 9k, and indicator lamps 9l, 9m and 9n.

In FIG. 3, the ten key panel 9a is used to input numeric characters and symbols such as "#" (sharp) and "*" (asterisk).

The [YES] key 9b is pressed to input an affirmative acknowledge to a message displayed on the screen 9i of the operation display unit 9.

The [NO] key 9c is pressed to input a negative acknowledge to the message displayed on the screen 9i.

The [STOP] key 9d is pressed to command a forced suspension of the operations.

The [START] key 9e is pressed to start operations of various units of the image reading apparatus 1.

The [FUNCTION] key 9f is used with the ten key 9a. Pressing the [FUNCTION] key 9f and specified numbers of the ten key 9a calls various setting and registering functions of the image reading apparatus 1.

The group of arrow keys 9g includes a [↑] (up) key 9gu, a [↓] (down) key 9gd, a [→] (right) key 9gr, and a [←] (left) key 9gl. The keys 9gu, 0gd, 9gr and 9gl are used to select a specific item from items displayed on the screen 9i and to scroll the display on the screen 9i to any directions from side to side and up and down.

The keyboard 9h has a plurality of keys to input character strings of destinations in the Roman alphabet or Japanese katakana scripts.

The screen 9i displays various messages to inform a user about conditions of the image reading apparatus 1.

The [SPEED DIAL] key 9j is used to specify destination telephone numbers stored in abbreviated forms of two-digit number.

The [OUTPUT MODE] key 9k is used to set an output mode of the image data. The output mode is selected from copy, scan and facsimile modes. When the [OUTPUT MODE] key 9k is pressed, a result of the selection is stored as a value of an image data output mode setting flag Fout in a storing area 4e of FIG. 10, which will be described later.

The indicator lamps 9l, 9m and 9n correspond to the copy, scan and facsimile modes, respectively, and are designed to light to show which mode is selected. In FIG. 3, the indicator lamp 91 is lit to indicate that the copy mode is selected.

Figure 4:
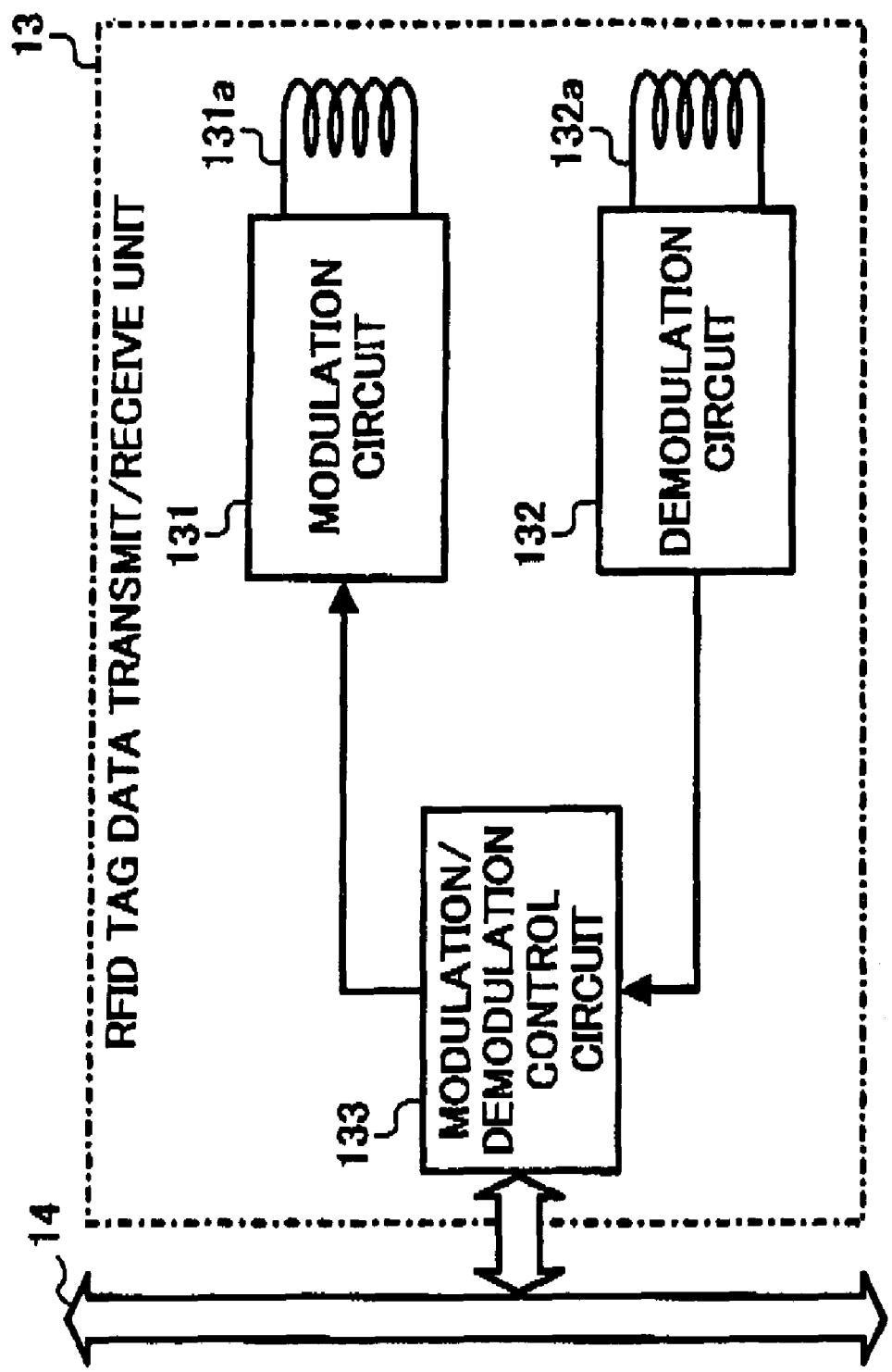
FIG. 4 is a block diagram of a RFID tag data communication unit of the image reading apparatus.

Referring to FIG. 4, a block diagram of the RFID tag data communication unit 13 of the image reading apparatus 1 is described.

In FIG. 4, the RFID tag data communication unit 13 includes a modulation circuit 131, a demodulation circuit 132 and a modulation and demodulation control circuit 133.

The modulation and demodulation control circuit 133 transmits the image data sent by the CPU 2 via the system bus 14 to the modulation circuit 131, and also transmits the image data sent by the demodulation circuit 132 via the system bus 14 to the CPU 2. The modulation and demodulation control circuit 133 activates and terminates the modulation circuit 131 to start and stop outputting carrier waves.

The modulation circuit 131 modulates modulating data sent from the modulation and demodulation control circuit 133, superimposes the modulating data to a carrier wave of a predetermined frequency, for example 2.45 GHz, and transmits from a coil antenna 131a into the air.

The demodulation circuit 132 demodulates the data according to the signal transmitted from the coil antenna 132a, and sends the data to the modulation and demodulation control circuit 133.

Figure 5:
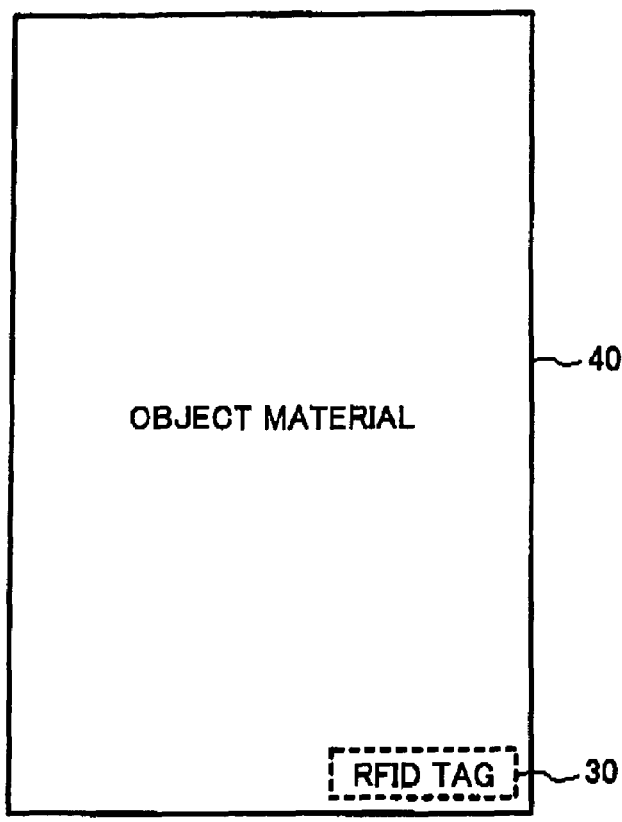
FIG. 5 is a plan view of an object material with a RFID tag attached.

Referring to FIG. 5, the object material 40 having the RFID tag 30 attached thereon is described.

The RFID tag 30 is embedded in the object material 40 or is labeled on a surface of the object material 40. The RFID tag 30 can be added to the object material 40 via a string.

The RFID tag 30 is a kind of radio frequency tag. The radio frequency tag has a small and thin structure with high memory capacity, which may take over barcode labels. The radio frequency tag is called an integrated circuit (IC) tag, an ID tag, a micro IC chip and so forth, and recently attracts wide attention. The radio frequency tag uses radio frequency to identify products without contacting.

A proposal has been made to embed an RFID tag chip in each of new banknotes to manage the banknotes. A banknote with the RFID tag chip embedded may be difficult to perfectly counterfeit. The banknote read by a scanner does not include the RFID tag chip, thereby a forgery of the banknote may be prevented. Conversely, it is also difficult that every low-end retailer introduces a device to determine whether or not a banknote is forged. Therefore, it is necessary that image reading apparatuses include functions to prevent counterfeiting of banknotes and valuable papers with the RFID tags.

Figure 6:
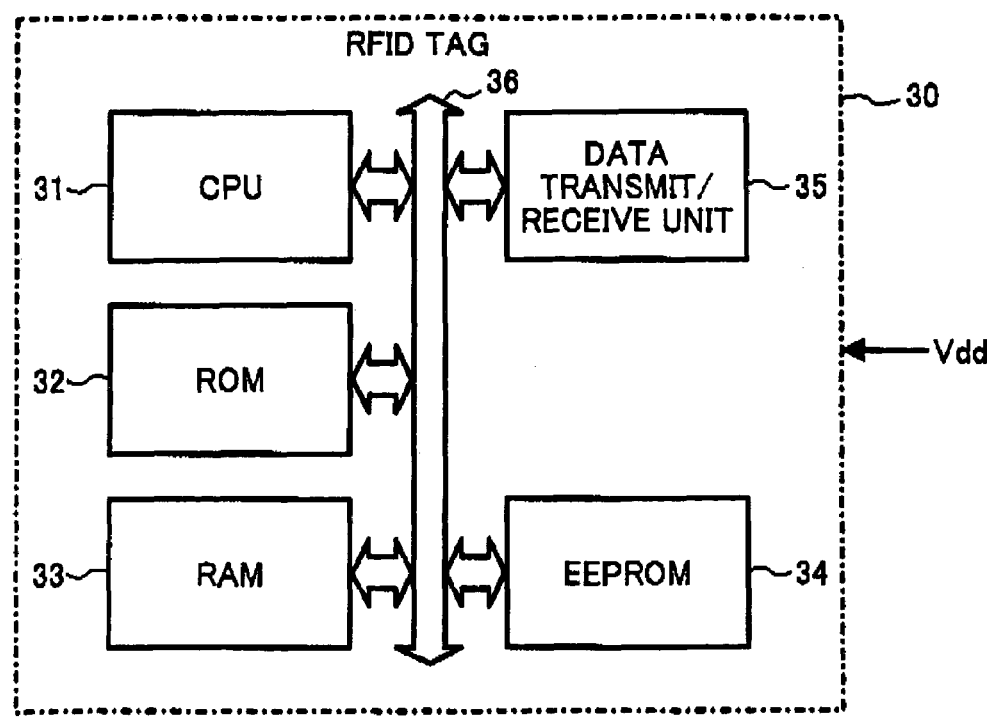
FIG. 6 is a block diagram of the RFID tag.

Referring to FIG. 6, a block diagram of the RFID tag 30 is described.

In FIG. 6, the RFID tag 30 includes a central processing unit (CPU) 31, a read only memory(ROM) 32, a random access memory (RAM) 33, an electrically erasable and programmable read only memory (EEPROM) 34, a data communication unit 35, and a system bus 36.

The CPU 31 uses the RAM 33 as a work area, controls various units based on control programs written in the ROM 32, and processes data related to the various units.

The ROM 32 stores the control programs for the CPU 31, as described above, and fixed data.

The RAM 33 is used by the CPU 31, as described above, as its work area.

The EEPROM 34 stores various data necessary for operating the image reading apparatus 1 and keeps the data available even when a power source of the RFID tag 30 is turned off.

The data communication unit 35 transmits signals to an apparatus for reading tag data from the RFID tag 30 and receives signals for writing data to the RFID tag 30.

The system bus 36 is a group of signal lines mainly including a data bus, address bus, control bus, and interruption signal line, which are used to exchange data between the above-described units.

The RFID tag 30 is activated by receiving a power source Vdd from the data communication unit 35, which will be described later.

A RFID tag transmission method includes an electromagnetic coupling type, an electromagnetic induction type, a microwave type and so forth. However, the transmission method is not limited to a radio transmission method used between the RFID tag 30 and the image reading apparatus 1.

Figure 7:
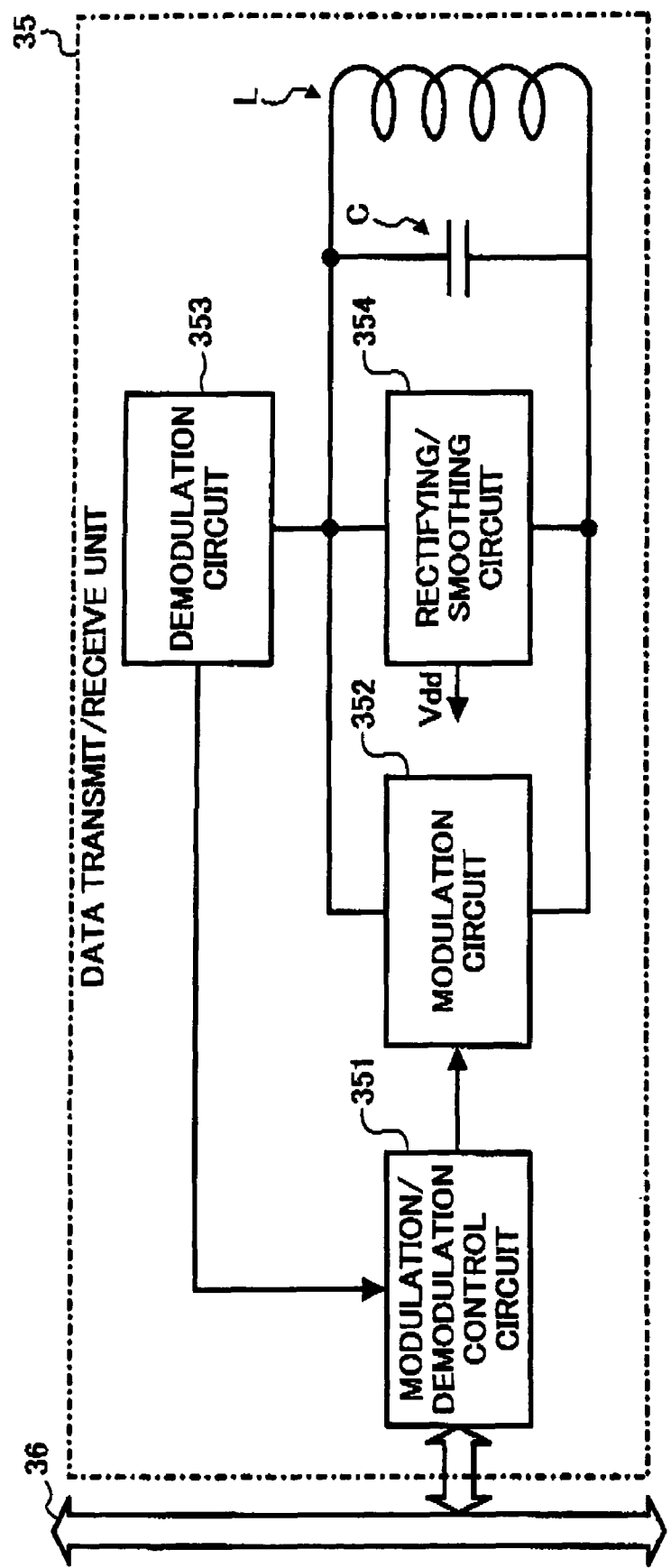
FIG. 7 is a block diagram of a data communication unit of the RFID tag.

Referring to FIG. 7, a block diagram of the data communication unit 35 is described.

In FIG. 7, the data communication unit 35 includes a modulation and demodulation control circuit 351, a modulation circuit 352, a demodulation circuit 353, and a rectifying and smoothing circuit 354. The data communication unit 35 communicates with other units in the image reading apparatus 1 via the system bus 36.

The modulation and demodulation control circuit 351 transmits the data sent from the CPU 31 via the system bus 36 to the modulation circuit 352, and also transmits the data sent by the demodulation circuit 353 via the system bus 36 to the CPU 31.

The modulation circuit 352 modulates modulating data sent from the modulation and demodulation control circuit 351, superimposes the modulating data to a carrier wave, and transmits from a coil antenna L into the air.

The demodulation circuit 353 receives the data by the coil antenna L, extracts a radio signal of the modulating data from the carrier wave having a predetermined frequency, 2.45 GHz, for example, which is in synchronization with a parallel capacitor C, demodulates the data according to the radio signal, and sends the data to the modulation and demodulation control circuit 351.

Applicable frequency bands to the data transmission in the data communication unit 35 are 2.45 GHz, 13.56 MHz, 900-960 MHz and so forth. With the frequency band of 13.56 MHz, for example, a power is generated in an electromagnetic induction method to provide low directivity and short distance of communications. The frequency band of 2.45 GHz provides a power generated by an electric current due to a resonant of a metal-wired receiving antenna and has high directivity and long distance of communications. A modulation method may be an amplitude shift keying (ASK) for sending to the RFID tag 30 and a frequency shift keying (FSK) for receiving from the RFID tag 30.

The rectifying and smoothing circuit 354 smoothes and rectifies an alternating voltage generated at both ends of the coil antenna L which receives the carrier wave, and outputs voltage that becomes the power source Vdd to activate the RFID tag 30.

The RFID tag 30 in this embodiment may be activated by a received frequency wave as described above. As an alternative, a small battery may be provided to activate the RFID tag 30. The present invention is not limited according to power supplying conditions. The RFID tag 30 is not limited to have a configuration of a microcomputer type including a CPU, a ROM, a RAM and so forth, and may have a configuration including a communication unit, a memory interface circuit and an EEPROM.

Figure 8A:
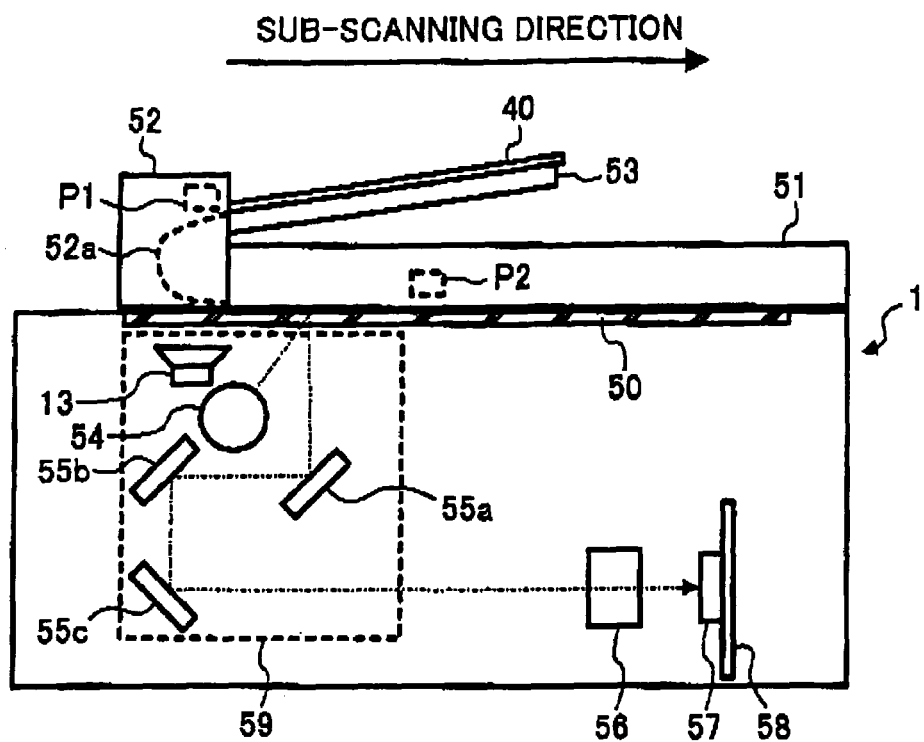
FIGS. 8A and 8B are cross sectional views of an image reading unit of the image reading apparatus.

Referring to FIG. 8A, a structure of the image reading unit 6 of the image reading apparatus 1 is described.

In FIG. 8A, the image reading unit 6 includes a contact glass 50, a plate 51, an automatic document feeder (ADF) 52, a sheet feeding tray 53, an optical unit 54, mirrors 55a, 55b and 55c, a reduced optical lens 56, a charge-coupled device (CCD) 57, a CCD board 58, and a moving member 59.

The contact glass 50 is disposed on the top of the image reading apparatus 1. The plate 51 is disposed such that the plate 51 can freely be opened and closed to cover a surface of the contact glass 50. The plate 51 presses the object material 40 placed on the contact glass 50 by its own weight, so that the object material 40 is firmly attached to the surface of the contact glass 50. The plate 51 has a belt driving mechanism for outputting the object material conveyed onto the contact glass 50 through the ADF 52.

The ADF 52 conveys the object material 40 placed on the sheet feeding tray 53 along a sheet conveying path 52a onto the contact glass 50.

A light beam is emitted from the optical unit 54 disposed at a lower portion of the contact glass 50 to irradiate the object material 40 placed on the contact glass 50. The irradiated light beam is deflected by the object material 40, and by the mirrors 55a, 55b and 55c in this order. The light beam then enters the reduced optical lens 56 to form an image by linearly arranged devices of the CCD 57 on the CCD board 58. The thus formed image of the object material is photoelectrically converted and read per line in a main scanning direction.

The optical unit 54, the mirrors 55a, 55b and 55c are disposed on the moving member 59. The moving member 59 is driven by a sub-scanning mechanism and moves under the contact glass 50 in a sub-scanning direction, as indicated in FIG. 8A. With the movement of the moving member 59 in the sub-scanning direction, the image reading apparatus 1 can obtain image data on a surface of the object material 40 placed on the contact glass 50.

The object material 40 may be a paper sheet including the RFID tag 30, as shown in FIG. 5.

To transmit and receive data with the RFID tag 30 attached to the object material 40, the image reading apparatus 1 includes the RFID tag data communication unit 13, as previously described. The RFID tag data communication unit 13 is basically disposed at a predetermined position of the image reading apparatus 1, for example, on a control board.

To prevent misdetection of data, it is preferable that at least a transmitting and receiving portion, such as the coil antennas 131a and 132a, the modulation circuit 131 to drive the coil antenna 131a, and the demodulation circuit 132 to drive the coil antenna 132a, of the RFID tag data communication unit 13 is disposed at a position in a vicinity of the object material 40.

The RFID tag data communication unit 13 may be arranged at an inside of or a surface of the ADF 52 disposed in the vicinity of the object material 40 placed on the sheet feeding tray 53. As an alternative, the RFID tag data communication unit 13 may be arranged at an inside of or a surface of the plate 51 disposed in the vicinity of the object material 40 placed on the contact glass 50, or at an inside of or a surface of the sheet feeding tray 53.

In this embodiment, the RFID tag data communication unit 13 is disposed on the moving member 59 at a portion as close as possible with the contact glass 50, that is, the object material 40 placed on the contact glass 50. With the above-described structure, the RFID tag data communication unit 13 can detect the RFID tag 30 embedded in or attached to the object material 40 when the moving member 59 moves in a sub-scanning direction to read the image data of the object material 40.

As an alternative, a plurality of transmitting and receiving portions for the RFID tag data communication unit 13 may be disposed at positions on the plate 51, the ADF 52, and the sheet feeding tray 53 to widely search the RFID tag 30. In FIG. 8A, one transmitting and receiving portion is disposed at a position P1 in the ADF 52, and a different transmitting and receiving portion is disposed at a position P2 on the plate 51. A plurality of RFID tag data communication units 13 including respective transmitting and receiving portions may also be positioned. The positions P1 and P2 of the transmitting and receiving portions of the RFID tag data communication units 13 may be separated from each other, and may have antennas facing different directions.

The plate 51 may have a conductive plate or foil to protect the image reading apparatus 1 from electric waves coming from outside thereof, to prevent misdetection of data. The image reading apparatus 1 may have an entire radio shielding with the conductive plate or foil over the outside of the image reading apparatus 1 to further prevent misdetection of data.

In FIG. 8A, the RFID tag data communication unit 13 serving as a RFID tag reader and writer is fixedly disposed in the image reading apparatus 1. As an alternative, the RFID tag data communication unit 13 may be configured as a movable unit. Particularly, the RFID tag data communication unit 13 with the transmitting and receiving portion having an antenna or the transmitting and receiving portion alone may be configured to be rotated by a stepping motor. With the above-described structure, the RFID tag data communication unit 13 may rotate to search for the RFID tag 30 or at least the antenna of the RFID tag data communication unit 13 disposed on the moving member 59 may rotate while moving with the moving member 59 to search for the RFID tag 30.

Figure 8B:
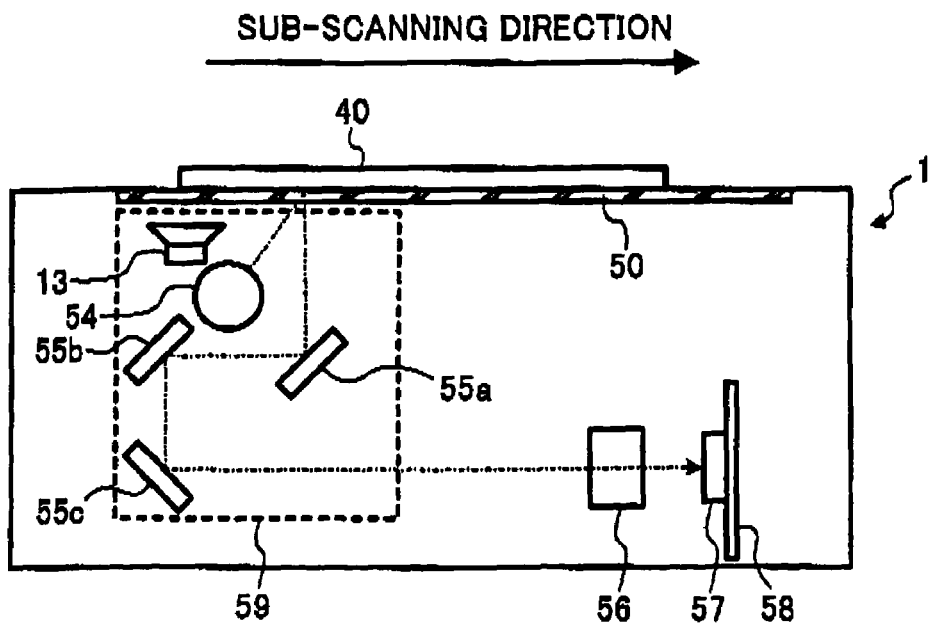

FIG. 8B shows the image reading unit 6 of the image reading apparatus 1 when the cover plate 51 and the ADF 52 integrally provided with the cover plate 51 are open. The cover plate 51 and the ADF 52 are not shown in FIG. 8B. Some users may operate the image reading apparatus 1 with the cover plate 51 left open. In addition, the cover plate 51 cannot be completely closed to read a surface of a three-dimensional object, as shown in FIG. 8B.

In this case, even through the object material 40 is firmly placed on the contact glass 50, the cover plate 51 and the ADF 52 are separated form the object material 40. Accordingly, it is preferably to mount the RFID tag data communication unit 13 on the moving member 59.

It is preferable that a transmission level of the carrier wave through the RFID tag data communication unit 13 is adjusted to a predetermined level to avoid misdetection of data. For example, it is necessary to avoid detecting a banknote with the RFID tag 30 that is put in a user's pocket, for example. The predetermined level is preferably set to detect the RFID tag 30 alone that is placed in a range between the object material 40 and the RFID tag data communication unit 13.

Further, it is preferable that a sensitivity of the RFID tag data communication unit 13 is adjusted to a predetermined level such that the RFID tag data communication unit 13 can detect a signal sent from the RFID tag 30 alone that is placed in a range between the object material 40 and the RFID tag data communication unit 13.

The image reading unit 6 also includes a document sensor (not shown). The document sensor detects the object material placed on the contact glass 50 or in the ADF 52 when the object material blocks a light beam incident from a light emitting element to a light receiving element.

Figure 9:
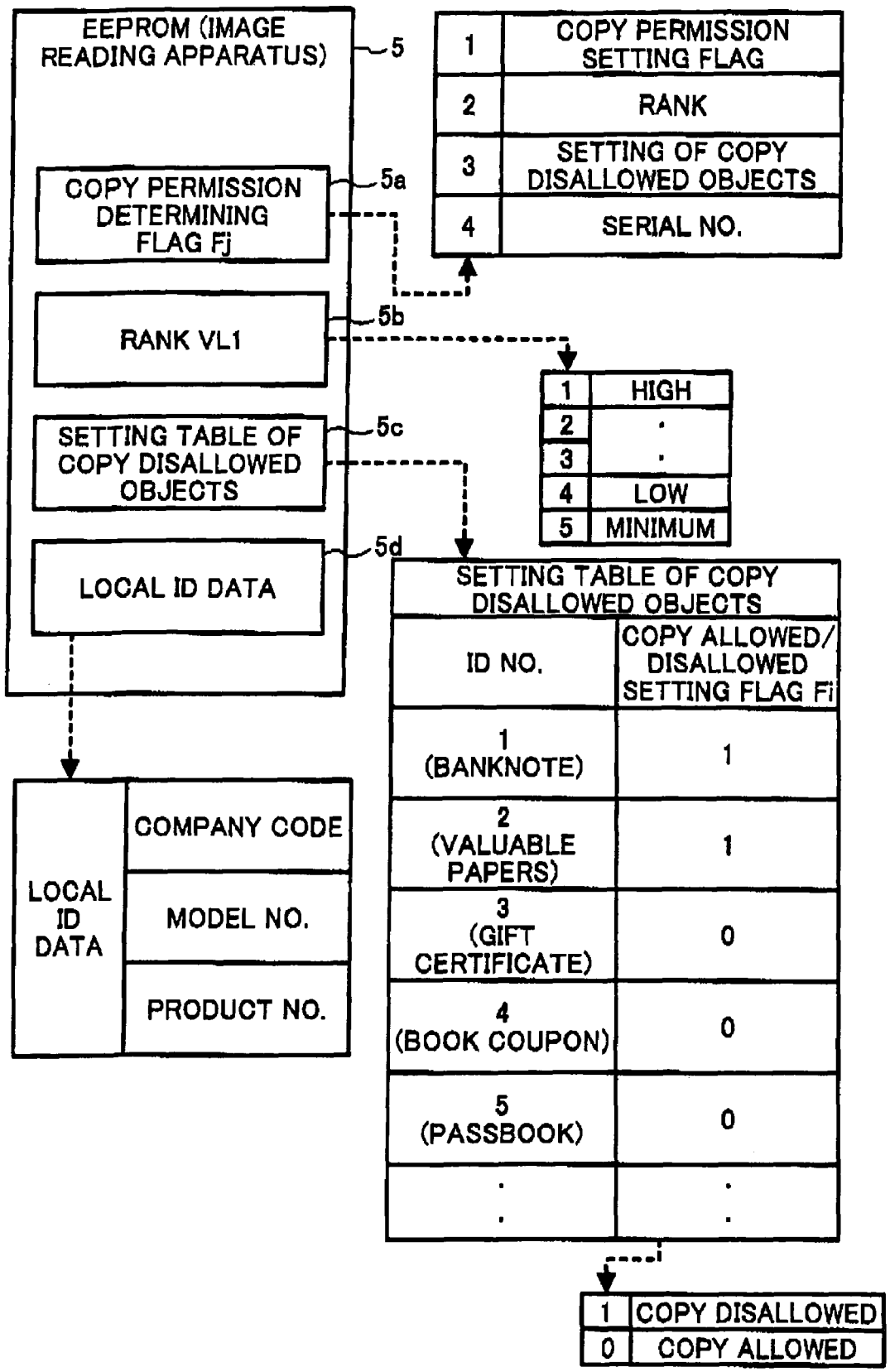
FIG. 9 is a chart of data stored in an EEPROM of the image reading apparatus.

Referring to FIG. 9, a block diagram of a structure of the EEPROM 5 is described.

In FIG. 9, the EEPROM 5 stores a copy permission determining flag Fj in a storing area 5a, a rank value VL1 in a storing area 5b, a setting table of copy disallowed objects in a storing area 5c, and a local apparatus identification (ID) data in a storing area 5d.

The copy permission determining flag Fj in the storing area 5a selects a reference item to determine copy permission, and specifies the rank value VL1, which may be set to any one of "1" to "4". When the rank value VL1 is set to "1", the copy permission is determined based on a copy permission setting flag. When the rank value VL1 is set to "2", the copy permission is determined based on ranks. When the rank value VL1 is set to "3", the copy permission is determined based on a setting of disallowed objects. When the rank value VL1 is set to "4", the copy permission is determined based on a serial number.

In an embodiment according to the present invention, the reference item of the copy permission determination may be selectable according to the copy permission determining flag Fj. As an alternative, any one of the items can be fixed as a reference item.

The rank VL1 stored in the storing area 5b is previously set to any one of "1" through "4". When the rank value VL1 is set to "1", the severest restriction is imposed on the copy, and when the rank value VL1 is set to "4", the least restriction is imposed on the copy. When the rank value VL2 is set to one or either "2" and "3", a level of the restriction stands between "1" and "4" of the rank value VL1. While the rank value VL1 has five ranks in this embodiment, the rank value VL1 may also have less or more ranks.

The copy disallowed objects are graded as follows. The rank value VL1 which is set to "1" may generally prohibit reproduction of object materials such as banknotes and valuable papers. The rank value VL1 which is set to "2" may generally prohibit reproduction of object materials including copyrights and rights of portrait. The rank value VL1 which is set to "3" may generally prohibit reproduction of object materials such as tickets. The rank value VL1 which is set to "4" may generally prohibit reproduction of object materials related to personal identification, such as driving licenses and health insurance cards. The rank value VL1 which is set to "5", if necessary, may generally prohibit reproduction of the object materials that do not belong to the above-described classifications. That is, the rank value VL1 set to "5" corresponds to the object materials for company or personal use. For example, order forms and reports used in company and personal letters fall in "5" of the rank value VL1.

Examples of the object materials that can be disallowed to copy are banknotes, valuable papers (e.g., drafts, checks, gift certificates, stock certificates, and other certificates identifying property rights of an owner); books, magazines, and other reading materials including copyright and rights of portrait; film tickets and concert tickets; train tickets and free passports; cash vouchers, gift cards, shopping coupons, gift certificates; admission tickets for amusement parks, exhibitions and museums; musical scores and lyric sheets; lotteries; highway cards and bus cards; driving and other licenses, passports, health insurance cards, credit cards, bank cards, passbook, and so forth.

The rank value VL1 stored in the storing area 5b of the EPROM 5 of the image reading apparatus communicates with rank value VL2 stored in the RFID tag 30 attached to the object material to determine whether copy permission of the object material is "copy allowed" or "copy disallowed". See FIG. 12 for detailed description of the rank value VL2.

When the rank VL1 is set to "1" in the storing area 5b of the EEPROM 5 of the image reading apparatus, the object material having the rank value VL2 which is set to any one of "1" to "4" is allowed to copy. When the rank VL1 is set to "2", the object material having the rank value VL2 which is set to any one of "2" through "4" is allowed to copy. When the rank VL1 is set to "3", the object material having the rank value VL2 which set to either one of "3" and "4" is allowed to copy. When the rank VL1 is set to "4", the object material having the rank value VL2 which is set to "4" is allowed to copy.

The object material classified into any one of "1" through "4" of the rank value VL1 is basically disallowed to copy. However, it may be necessary to copy the object material according to the purpose of using the image reading apparatus 1. For example, municipal or local government office may need to have copies of the object material such as a driving license and a health insurance card as personal identification.

In such a case, the image reading apparatus 1 may be adjusted at a factory or by a qualified service person to set the rank VL1 to "4". The qualified service person may be called because the operation of the above-described setting may need to input a password via the operation display unit 9 to adjust the image reading apparatus 1.

As previously described, the object materials which do not belong to any one of "1" through "4" are classified to "5" of the rank value VL1 stored in the storing area 5b.

The rank VL1 is referred to when the copy permission determining flag Fj of the storing area 5a is set to "2" indicating the rank value VL1.

The setting table of copy disallowed objects stored in the storing area 5c is a table to previously set copy disallowed objects of various object materials. The setting table includes identification (ID) numbers and values of a copy authorization setting flag Fi corresponding to the respective ID numbers.

The copy authorization setting flag Fi indicates "1" when the copy is disallowed and "0" when the copy is allowed. The ID numbers correspond to respective object materials. ID number 1 represents banknotes. ID number 2 represents valuable papers. ID number 3 represents gift certificates. ID number 4 represents book coupons. ID number 5 represents passbooks. In the setting table of FIG. 9, banknotes and valuable papers are disallowed to copy.

In the setting table of copy disallowed objects stored in the storing area 5c of FIG. 9, the copy authorization setting flag Fi determines the copy permission of an object material. As an alternative, the setting table may omit the setting of the copy authorization setting flag Fi and disallow copies of the object materials previously registered in the setting table in the storing area 5c.

The setting table of copy disallowed objects stored in the storing area 5c is referred to when the copy permission determining flag Fj of the storing area 5a is set to 3 indicating the setting of copy disallowed objects.

Local apparatus identification (ID) data stored in the storing area 5d is data having a company code, model number and product number. The local apparatus ID data is used to distinguish the local apparatus of the image reading apparatus 1 from other apparatuses of the same model, from other models of the same manufacturer, and from other apparatuses of various models of other manufacturers.

Figure 10:
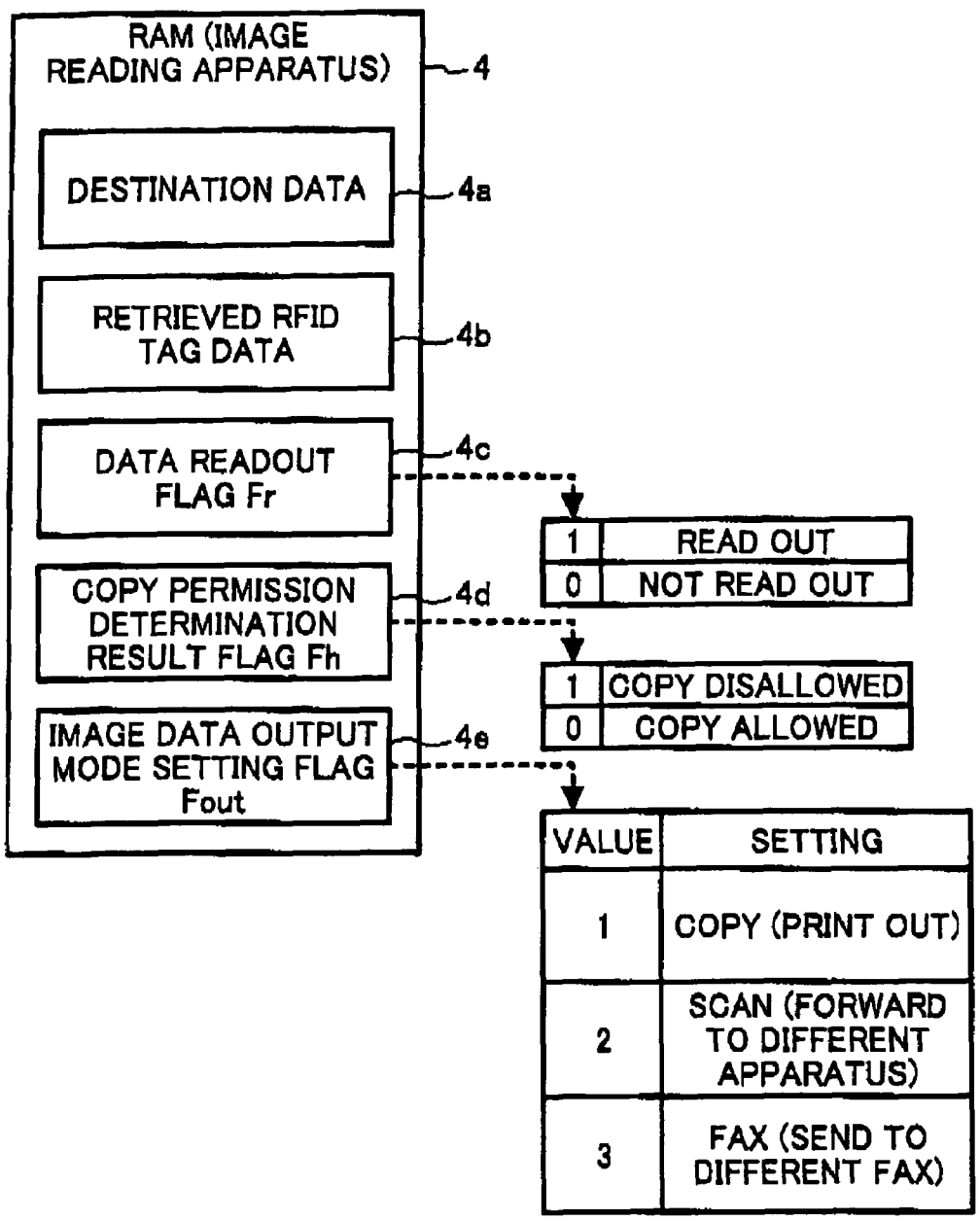
FIG. 10 is a chart of data stored in a RAM of the image reading apparatus.

Referring to FIG. 10, a chart of data contents stored in the RAM 4 of the image reading apparatus 1 is described.

In FIG. 10, the RAM 4 includes five storing areas 4a, 4b, 4c, 4d and 4e.

The storing area 4a temporarily stores destination data. The destination data is used to specify a destination when the output mode of the image reading apparatus 1 is set to "fax mode".

The storing area 4b temporarily stores RFID tag data retrieved from the RFID tag 30.

The storing area 4c stores a data readout flag Fr. The data readout flag Fr indicates "1" when the data is read out and "0" when the data is not read out.

The storing area 4d stores a copy permission determination result flag Fh. The copy permission determination result flag Fh indicates "1" when a result of the copy permission is determined as "copy disallowed" and "0" when the result of the copy permission is determined as "copy allowed". According to a result of the copy permission determination result flag Fh, that is, according to a result of the copy permission, the CPU 2 controls to switch different processes, the copy output process and a copy prevention process, as an image data reading controlling mechanism. When the result of the copy permission is "copy allowed", the CPU 2 controls to perform the copy output process. When the result of the copy permission is "copy disallowed", the CPU 2 controls to perform the copy prevention process.

A storing area 4e stores an image data output mode setting flag Fout. The image data output mode setting flag Fout indicates "1" when the output mode is a copy mode, that is, printing out the image data of the object material, "2" when the output mode is a scan mode, that is, forwarding the image data of the object material to a different apparatus, and "3" when the output mode is a fax mode, that is, sending the image data of the object material to a different facsimile machine. The numbers of the image data output mode setting flag Fout are changed according to a key pressing operation of the [OUTPUT MODE] key 9k of the operation display unit 9. The numbers shown in the operation display unit 9 may scroll in order of "1, 2, 3, 1, 2, 3 . . . ".

Figure 11:
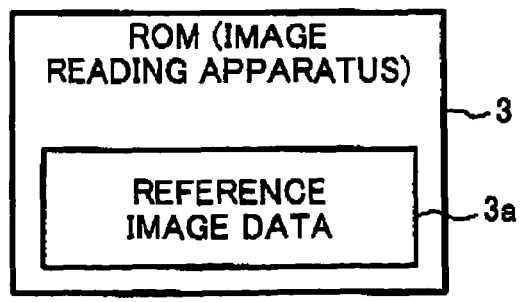
FIG. 11 is a chart of data stored in a ROM of the image reading apparatus.

Referring to FIG. 11, a chart of data contents stored in the ROM 3 of the image reading apparatus 1 is described.

In FIG. 11, a storing area 3a previously stores reference image data. The reference image data is referred to when the copy permission is determined based on image recognition.

Figure 12:
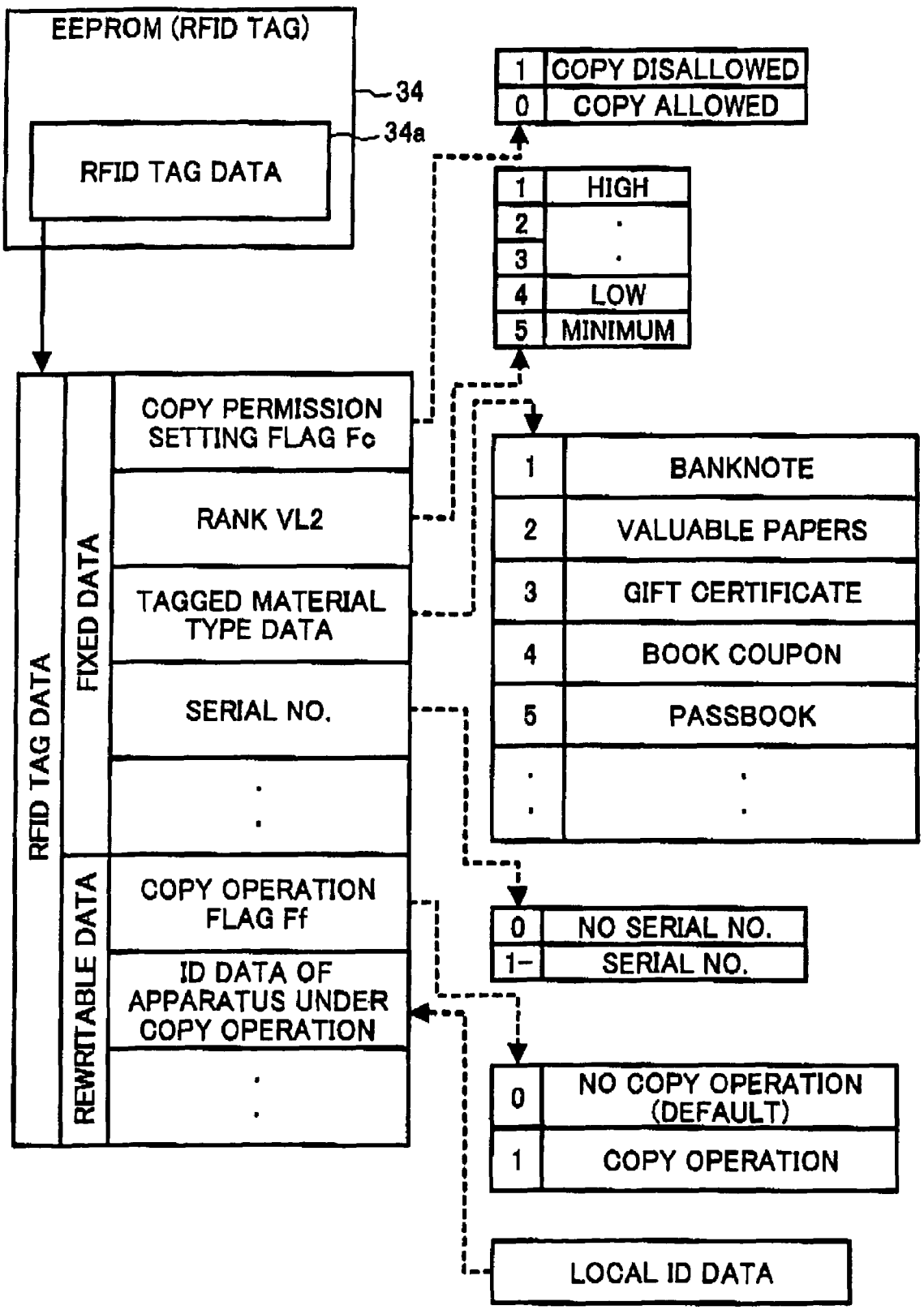
FIG. 12 is a chart of data stored in an EEPROM of the RFID tag.

Referring to FIG. 12, a chart of data contents stored in the EEPROM 34 of the RFID tag 30 is described.

A storing area 34a of the EEPROM 34 stores RFID tag data.

The RFID tag data stored in the storing area 34a includes data contents corresponding to those stored in the EEPROM 5 of the image reading apparatus 1 shown in FIG. 9.

The RFID tag data stored in the storing area 34a includes "fixed data" and "rewritable data". The "fixed data" is read only data and is not rewritable. The "rewritable data" can be rewritten for change.

The "fixed data" includes a "copy permission setting flag Fc", "rank value VL2", "tagged material type data", and "serial number".

The International Organization for Standardization (ISO) has examined standardization of coding system, such as the unique item code, of the RFID tag data. The unique item code, for example, includes four coding items, "data identifier (DI) ", "organization code", "label issuer code", and "serial number". The "tagged material type data" corresponds to the "label issuer code", and the "serial number" of the fixed data of the RFID tag data corresponds to the "serial number" of the unit item code. While not being included in the above-described coding system, the "copy permission setting flag Fc" and the "rank value VL2" may be embedded in a header of a coding system other than the above-described coding system. The header includes data strings used for management data different from the coding system.

The "copy permission setting flag Fc" of the "fixed data" is referred to when the copy permission determining flag Fj of FIG. 9 is set to "1", reflecting a user's desire to disallow a copy of the object material with the RFID tag 30 attached. When the "copy permission setting flag Fc" is set to "1", the copy permission is "copy disallowed". When the "copy permission setting flag Fc" is set to "0", the copy permission is "copy allowed".

The "rank value VL2" of the "fixed data" corresponds to the rank value VL1 of the storing area 5b of FIG. 9. The rank value VL2 includes ranks from 1 to 5. The ranks show respective levels of regulations of copies. The user can set the ranks of copy disallowed materials. In this embodiment, the driving license falls in "4" of the rank value VL2, and the banknote and valuable papers fall in "1" of the rank value VL2.

The "tagged material type data" of the "fixed data" corresponds to the setting table of disallowed copy objects stored in the storing area 5c shown in FIG. 9. The "tagged material type data" may have a setting value corresponding to a type of the object material where the RFID tag 30 is attached. For example, the object material is a book coupon, the setting value may be "4".

When a RFID tagged material corresponding to the object material 40 is added with a serial number such as a banknote, the "serial number" of the "fixed data" corresponds to the serial number (symbols available) of the RFID tagged material. When "0" is set to the "serial number", the RFID tagged material does not have a serial number thereon, that is, the RFID tagged material is not a banknote.

The "fixed data" of the RFID tag data stored in the storing area 34a is retrieved by the image reading apparatus 1 through a process described below, and is referred to by the image reading apparatus 1 for determining the copy permission. Assuming the RFID tag data stored in the storing area 34a has a configuration of 128 bit strings, for example. When the image reading apparatus 1 is previously informed of the data format of the configuration, particularly addresses and lengths of each data, the "fixed data" of the RFID tag data stored in the storing area 34a may correctly be read.

As an alternative, the image reading apparatus 1 and the RFID tag 30 may communicate under a predetermined protocol to sequentially transmit and receive each data. That is, the present invention is not limited to the above-described data transmission method used between the image reading apparatus 1 and the RFID tag 30.

The "rewritable data" of the RFID tag data of the storing area 34a includes a "copy operation flag Ff" and an "identification (ID) data of apparatus under copy operation". When the "copy operation flag Ff" is set to "1", a copy operation is performed. When the "copy operation flag Ff" is set to "0", no copy operation is performed, which is the default value. The "ID data of apparatus under copy operation" is written upon the setting to "1" of the "copy operation flag Ff" according to a process which will be described below. The "ID data of apparatus under copy operation" includes contents such as a company code, a model number, and a product number. The contents included in the "ID data of apparatus under copy operation" are same as those included in the local apparatus ID data stored in the storing area 5d of FIG. 9. The local apparatus identification data of FIG. 9 is sent from the transmitter and receiver 13 of FIG. 8A of the image reading apparatus 1 to the RFID tag 30 to write the data in the RFID tag 30.

Figure 13:
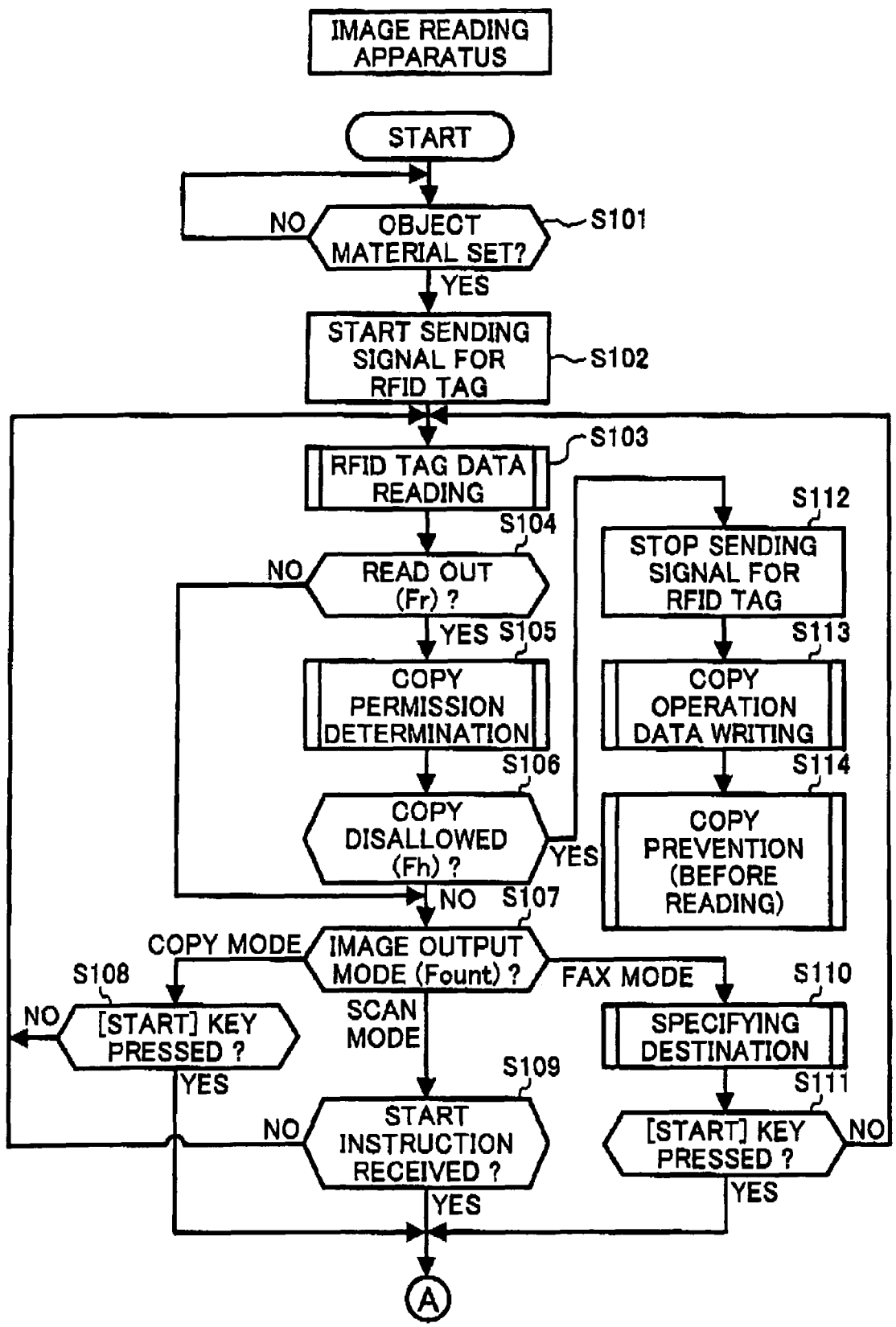
FIG. 13 is a flowchart showing an image reading control process performed in the image reading apparatus.

Referring to a flowchart of FIG. 13, an image reading control procedure performed by the image reading apparatus 1 to control image reading operations as an image reading control mechanism is described. In the procedure shown in FIG. 13, step S105 is performed as a copy permission determining mechanism.

In step S101 of FIG. 13, the CPU 2 communicates with an object sensor to determine whether an object material is set either on the contact glass 50 or on the tray 53 of the image reading apparatus 1. When the object material is set neither on the contact glass 50 nor on the tray 53, the determination result in step S101 is NO, and the process of step S101 repeats until the object material is set either on the contact glass 50 or on the tray 53. When the object material is set either on the contact glass 50 or on the tray 53 of the image reading apparatus 1, the determination result in step S101 is YES, and the process goes to step S102.

The CPU 2 starts sending a radio signal to communicate with the RFID tag 30 in step S102, and the CPU 2 starts reading out RFID tag data according to the radio signal, which is referred to as a RFID tag data reading process, in step S103. After step S103, the process goes to step S104.

In step S104, it is determined whether the RFID tag data is read out. When the RFID tag data is not read out, the determination result in step S104 is NO, the data readout flag Fr is set to "0", and the process goes to step S107, which will be described below. When the RFID tag data is read out, the determination result in step S104 is YES, the data readout flag Fr is set to "1", and the process goes to step S105.

In step S105, the CPU 2 of the image reading apparatus 1 performs a copy permission determining process. The copy permission determining process determines whether a permission to copy the object material is "copy allowed" or "copy disallowed". When the result of the permission to copy is "copy allowed", the copy permission determination result flag Fh is reset to "0". When the result of the permission to copy is "copy disallowed", the copy permission determination result flag Fh is set to "1". After step S105, the process goes to step S106.

In step S106, it is determined, based on the results of step S105, whether the copying of the object material is allowed or disallowed. When the copying of the object material is allowed, the determination result in step S106 is NO, and the process goes to step S107. When the copying of the object material is disallowed, the determination result in step S106 is YES, and the process goes to step S12, which will be described below.

In step S107, it is determined, based on the image data output mode setting flag Fout, whether the image output mode is selected from a "copy mode", "scan mode", and "fax mode".

When the "copy mode" is selected, the process goes to step S108.

In step S108, it is determined whether the [START] key 9e is pressed. When the [START] key 9e is not pressed, the determination result in step S108 is NO, and the process goes back to step S103. When the [START] key 9e is pressed, the determination result in step S108 is YES, and the process goes to step S202 in FIG. 14, which is indicated as "A" in FIG. 13.

When the "scan mode" is selected, the process goes to step S109.

In step S109, it is determined whether an instruction to start scanning the image data is issued, for example, by the PC 101 via the LAN 100. When the instruction is not issued, the determination result in step S109 is NO, and the process goes back to step S103. When the instruction is issued, the determination result in step S109 is YES, and the process goes to step S202 in FIG. 14, which is indicated as "A" in FIG. 13.

When the "fax mode" is selected, the process goes to step S110.

Before step S110, destination data such as a telephone number or a mail address is inputted via the operation display unit 9. In step S110, the thus inputted destination data is stored in the storing area 4a of the RAM 4 shown in FIG. 10, and the process goes to step S111.

In step S111, it is determined whether the [START] key 9e is pressed. When the [START] key 9e is not pressed, the determination result in step S111 is NO, and the process goes back to step S103. When the [START] key 9e is pressed, the determination result in step S111 is YES, and the process goes to step S202 in FIG. 14, which is indicated as "A" in FIG. 13.

As previously described, when the determination result in step S106 is YES, the process goes to step S112.

The CPU 2 of the image reading apparatus 1 stops sending the radio signal to communicate with the RFID tag 30 in step S112, writes copy operation data, which is referred to as a copy operation data writing process, in step S113, and performs the copy prevention process in step S114. The CPU 2 may continue to send the radio signal even if the determination result in step S106 is YES. However, the radio signal is not necessarily sent after the copy is disallowed, thereby it is preferable to stop sending the radio signal immediately after the RFID tag data is received or a reception of the RFID tag data is confirmed.

During the operations described above, the CPU 2 repeats reading out the RFID tag data during a period from when the object material is set either on the contact glass 50 or on the tray 53 to when the reading operation starts. When the RFID tag data is read out, the copy permission is determined based on the RFID tag data. When the copy permission is determined as "copy disallowed", the copy operation data is written and the copy prevention process is performed. Thus, an image included in the object material is not copied, resulting in preventing illegal reproduction of the object material such as a copy-prohibited document.

Figure 14:
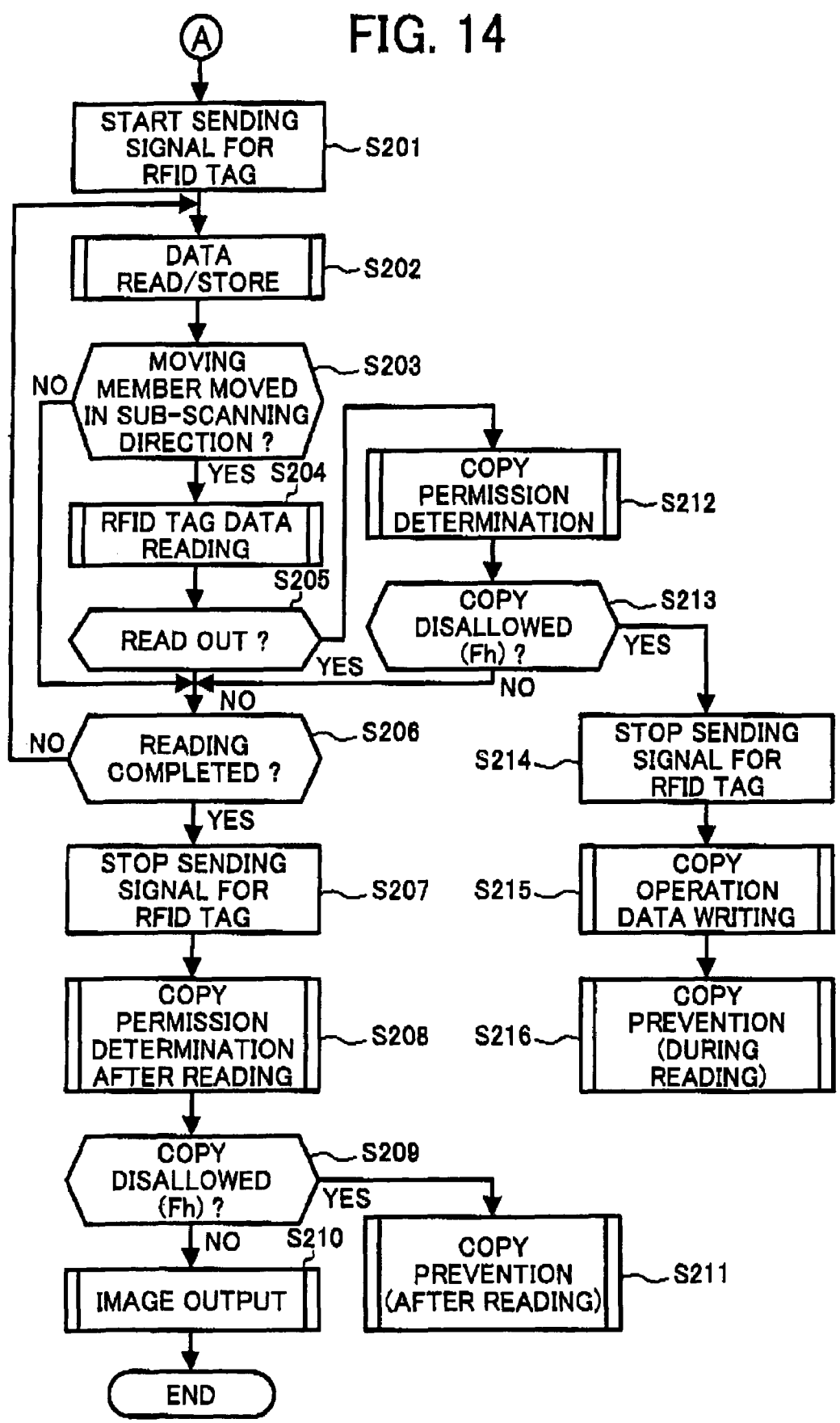
FIG. 14 is a flowchart showing the image reading control process performed in the image reading apparatus, continued from FIG. 13.

Referring to a flowchart of FIG. 14, the image reading control procedure continued from FIG. 13 is described. In the procedure shown in FIG. 14, steps S208 and S212 are performed as a copy permission determining mechanism.

Before processing step S202, step S201 may be performed to start sending the radio signal to communicate with the RFID tag 30, which is the same operation as that performed in step S102 shown in FIG. 13. Step S201 may be performed when the image reading unit 6 does not include the object sensor. When the object sensor is not provided to the image reading unit 6, a setting of an object material in the image reading apparatus 1 is detected according to operations or instructions of starting image reading. In a case where an object material 40 with the RFID tag 30 is placed in a vicinity of the RFID tag data communication unit 13 before a start of reading the object material 40, the RFID tag data communication unit 13 may misread the RFID tag data from the RFID tag 30. Performing step S201 may prevent the misreading.

When step S201 shown in FIG. 14 is processed, step S102 shown in FIG. 13 is skipped in the operation flow.

In step S202, image data included in the object material 40 is read, and is subsequently stored in the RAM 4. After step S202, the process goes to step S203.

In step S203, it is determined whether the moving member 59 travels by a predetermined distance in a sub-scanning direction. When the moving member 59 does not travel by the predetermined distance in the sub-scanning direction, the determination result in step S203 is NO, and the process jumps to step S206, which will be described below. When the moving member 59 travels by the predetermined distance in the sub-scanning direction, the determination result in step S203 is YES, and the process goes to step S204.

The movement of the moving member 59 is determined based on a reading operation performed by the RFID tag data communication unit 13 disposed on the moving member 59 as shown in FIG. 8. The RFID tag data communication unit 13 reads the RFID tag data every time the moving member 59 moves by a predetermined distance. The predetermined distance is obtained from a read line density and a number of read lines. For example, when the read line density is 200 lines per inch and the number of read lines is 200, the moving member 59 is determined to move for one inch.

In step S204, the RFID tag data reading process is performed. After step S204, the process goes to step S205.

In step S205, it is determined whether the RFID tag data is read out. When the RFID tag data is not read out, the determination result in step S205 is NO, the data readout flag Fr is set to "0", and the process goes to step S206, which will be described later. When the RFID tag data is read out, the determination result in step S205 is YES, the data readout flag Fr is set to "1", and the process goes to step S212.

In step S212, the CPU 2 of the image reading apparatus 1 performs the copy permission determining process. The copy permission determining process determines whether a permission to copy the object material is "copy allowed" or "copy disallowed". When the result of the permission to copy is "copy allowed", the copy permission determination result flag Fh is reset to "0". When the result of the permission to copy is "copy disallowed", the copy permission determination result flag Fh is set to "1". After step S212, the process goes to step S213.

In step S213, it is determined, based on the results of step S212, whether the copying of the object material is allowed or disallowed. When the copying of the object material is allowed, the determination result in step S213 is NO, and the process goes to step S206. When the copying of the object material is disallowed, the determination result in step S213 is YES, and the process goes to step S214, which will be described later.

In step S206, it is determined whether the reading of the RFID tag data is completed. When the reading of the RFID tag data is not completed, the determination result in step S206 is NO, and the process goes back to step S202. When the reading of the RFID tag data is completed, the determination result in step S206 is YES, and the process goes to step S207.

The CPU 2 of the image reading apparatus 1 stops sending the radio signal to communicate with the RFID tag 30 in step S207, and performs a post-reading copy permission determining process in step S208. In the post-reading copy permission determining process, it is determined whether a permission to copy the object material is "copy allowed" or "copy disallowed". When the result of the permission to copy is "copy allowed", the copy permission determination result flag Fh is reset to "0". When the result of the permission to copy is "copy disallowed", the copy permission determination result flag Fh is set to "1".

The post-reading copy permission determining process performed in step S208 is an operation for comparing image data. As shown in FIG. 11, pattern data previously stored in the storing area 3a of the ROM 3 for distinguishing copy-prohibited documents, such as currency banknotes and valuable papers, and image data read through the above-described operations performed in the image reading apparatus 1. As an alternative, the image data may be compared with pattern data focusing on a specific pattern. For example, the image data may be judged as a currency banknote by detecting shadings of the currency banknote, as previously described in the background technique, which can be achieved with a small amount of pattern data. Alternatively, the above-described background technique may be used for detecting currency banknotes and the pattern data previously stored in the ROM 3 may be used for detecting copy-prohibited documents other than the currency banknotes.

After step S208, the process goes to step S209.

In step S209, it is determined, based on the results of step S208, whether the copying of the object material is allowed or disallowed. When the copying of the object material is allowed, the determination result in step S209 is NO, and the process goes to step S210. After step S210, the process completes. A detailed operation flow of step S210 will be described later, referring to FIG. 15. When the copying of the object material is disallowed, the determination result in step S209 is YES, and the process goes to step S211. A detailed operation flow of step S211 will be described later, referring to FIG. 25.

As previously described, the process goes to step S214 when the determination result in step S213 is YES. At this time, the CPU 2 of the image reading apparatus 1 stops sending the radio signal to communicate with the RFID tag 30 in step S214, performs the copy operation data writing process in step S215, and performs the copy prevention process in step S216.

During the operations described above, the CPU 2 repeats reading out the RFID tag data while reading the object material. When the RFID tag data is read out, the copy permission is determined based on the RFID tag data. When the copy permission is determined as "copy disallowed", the copy operation data is written and the copy prevention process is performed. Thus, an image included in the object material is not copied, resulting in preventing a forgery of the object material.

Figure 15:
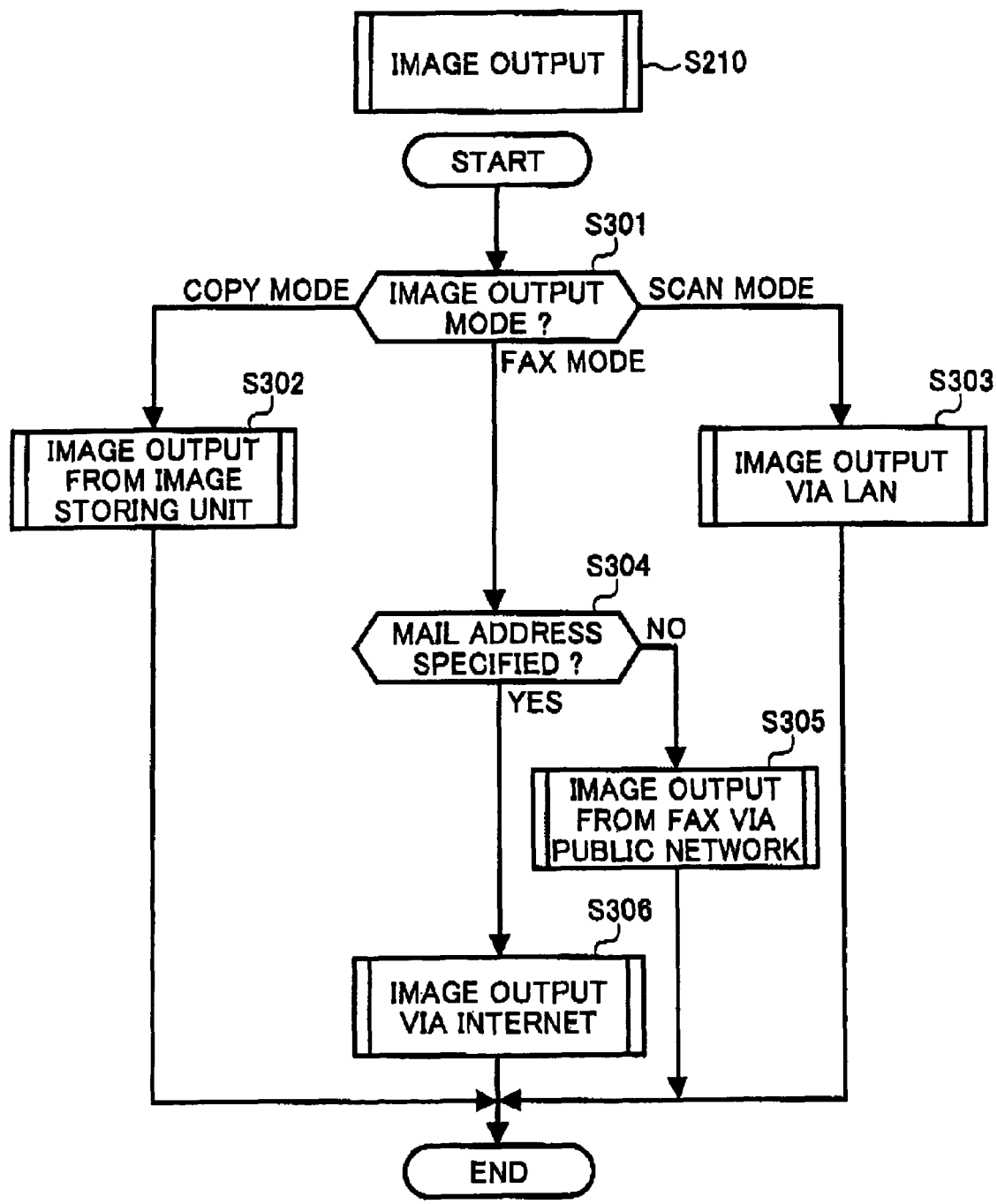
FIG. 15 is a flowchart showing detailed operations of an image output process.
Figure 22:
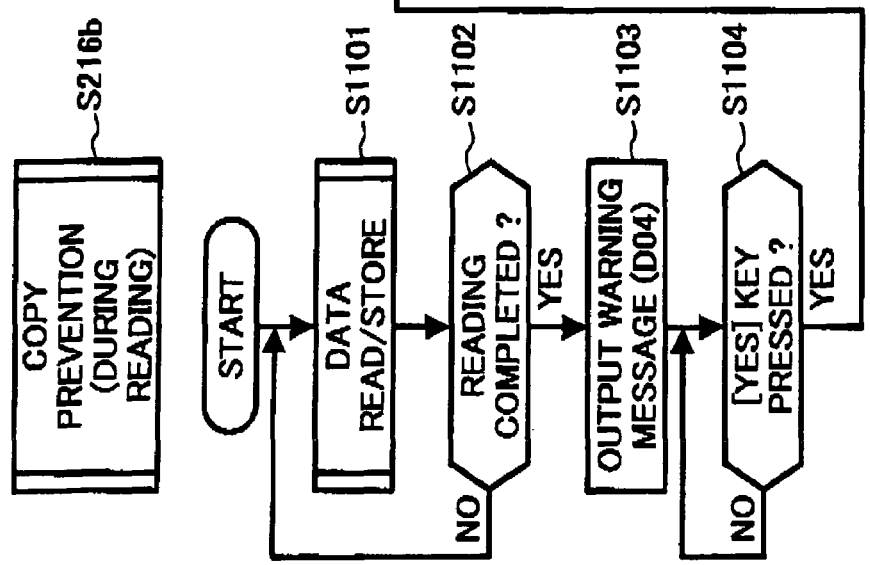
FIG. 22 a flowchart showing detailed operations of the copy prevention process following steps different from those of FIG. 19, FIG. 20 and FIG. 21.
Figure 26:
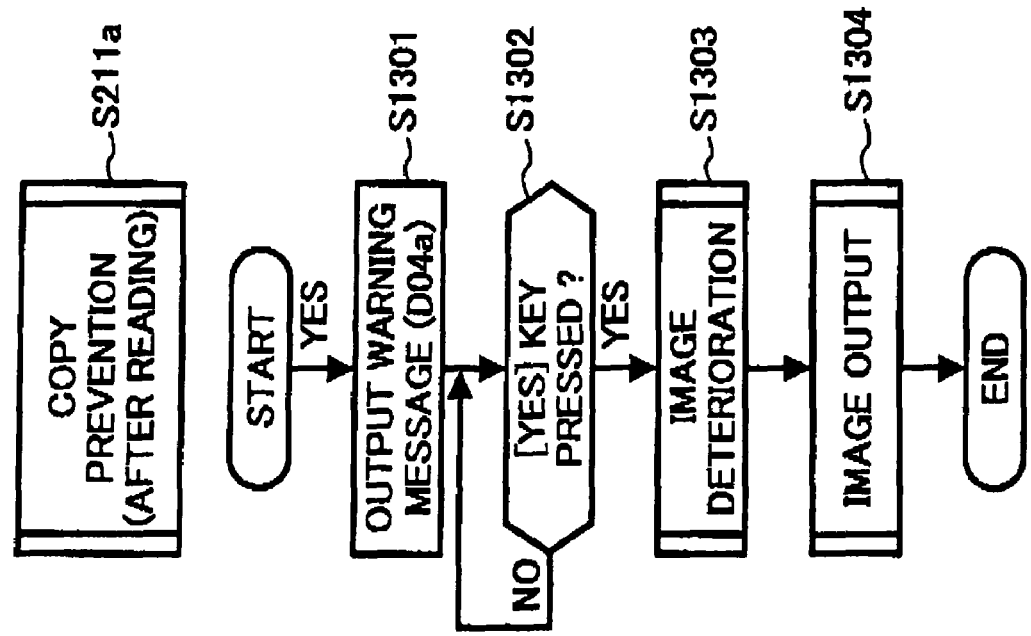
FIG. 26 is a flowchart showing detailed operations of the copy prevention process following steps different from those of FIG. 25.

Referring now to FIG. 15, a detailed flowchart of operations performed in step S210 shown in FIG. 14, step S1106 shown in FIG. 22, and step S1304 shown in FIG. 26 is described. Steps S1106 and S1304 will be described later.

In step S301 of FIG. 15, it is determined, based on the image data output mode setting flag Fout, whether the image output mode is selected from a "copy mode", "scan mode", and "fax mode".

When the "copy mode" is selected, the process goes to step S302.

In step S302, the image data read and stored in step S204 of FIG. 14 is printed out by the image reading unit 6 onto a recording medium such as a recording sheet. The printing method used when printing out the above-described image data may be any of an ink-jet printing method, an electrophotographic printing method and so forth. The present invention is not limited according to any recording and printing methods of the image data.

When the "scan mode" is selected, the process goes to step S303.

In step S303, the image data read and stored in step S204 of FIG. 14 is transferred to, for example, the PC 101 via the LAN 100 which has issued the instruction to start scanning the image data in sep S109 of FIG. 13.

When the "fax mode" is selected, the process goes to step S304.

In step S304, it is determined whether the destination data specified in step s110 of FIG. 13 and stored in the storing area 4a of FIG. 10 is a mail address. When the destination data is not the mail address, that is, when the destination data is a telephone number, the determination result in step S304 is NO, and the process goes to step S305. When the destination data is the mail address, the process goes to step S306.

In step S305, the image reading apparatus 1 calls the specified telephone number via the public network 400 to send the image data read and stored in step S202 of FIG. 14 by facsimile under the G3 facsimile protocol to the destination apparatus. As an alternative, a facsimile protocol other than the G3 facsimile protocol may be used.

In step S306, the image data read and stored in step S204 of FIG. 14 is sent by e-mail through the Internet 300.

Figure 16B:
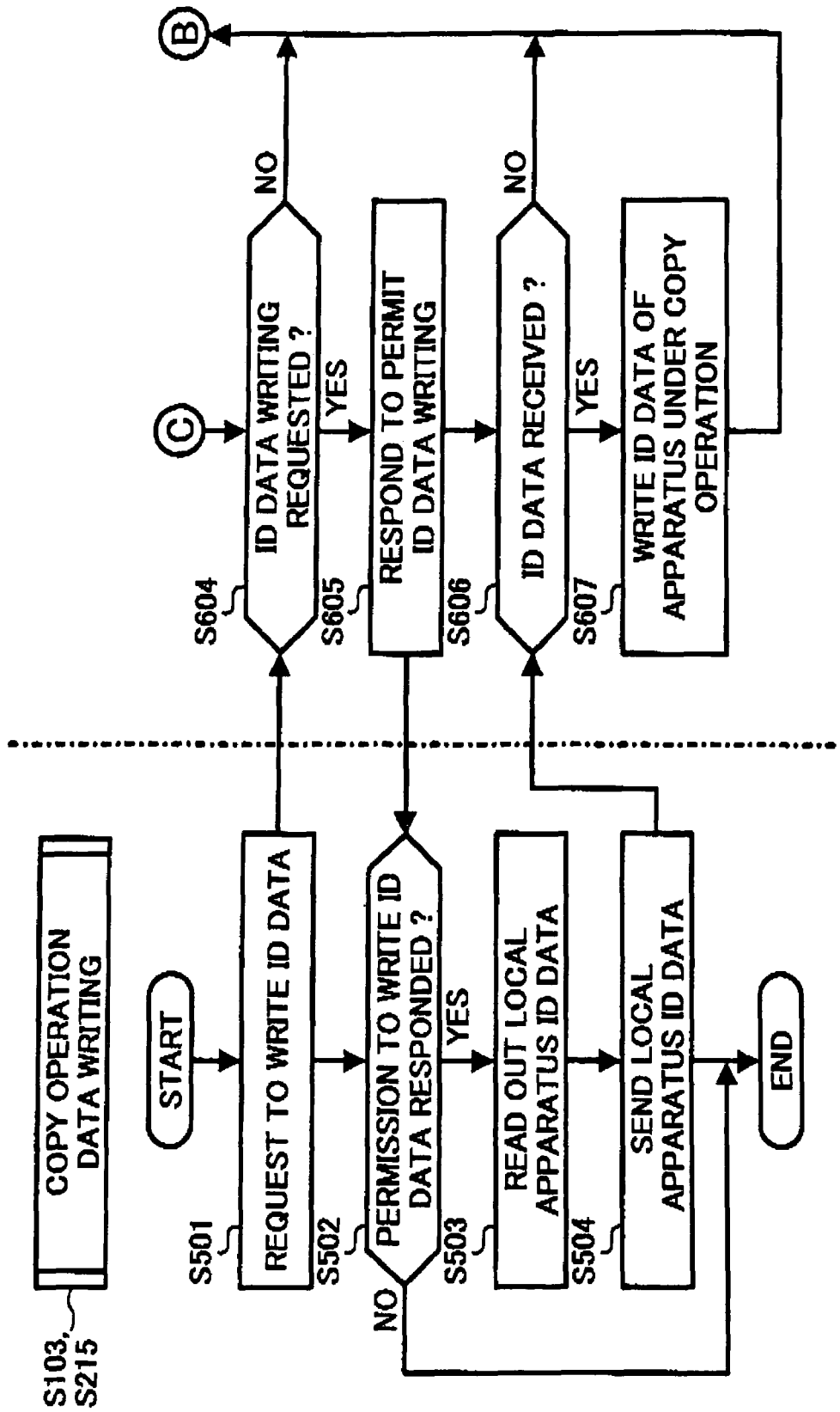

Referring to FIGS. 16A and 16B, detailed flowcharts of the RFID tag data reading process and the copy operation data writing process performed by the image reading apparatus 1 and a RFID tag responding process performed by the RFID tag 30 are described. The RFID tag data reading process corresponds to step S1103 of FIG. 13 and step S204 of FIG. 14. The copy operation data writing process corresponds to step S113 of FIG. 13 and step S215 of FIG. 14. The RFID tag responding process corresponds to the above-described processes.

The image reading apparatus 1 has previously sent the radio signal to communicate with the RFID tag 30 in step S102 of FIG. 13. As previously described in FIG. 7, when the RFID tag 30 receives the radio signal which is transmitted with the carrier wave, an alternating voltage is generated at both ends of the coil antenna L. The rectifying and smoothing circuit 354 of the data communication unit 35 smoothes and rectifies the alternating voltage to the power source Vdd which is used to activate the RFID tag 30. When the power source Vdd is supplied, the RFID tag 30 is initiated, and the process goes to step S601. Thus, the RFID tag 30 communicates with the image reading apparatus 1, and performs its operations while monitoring the operations of the image reading apparatus 1.

In FIG. 16A, the image reading apparatus 1 starts the RFID tag data reading process, and the process goes to step S401.

In step S401, the image reading apparatus 1 issues a setting data reading request to the RFID tag 30, and the RFID tag 30 receives the setting data reading request in step S601.

In step S601, it is determined whether the RFID tag 30 receives the setting data reading request issued by the image reading apparatus 1 corresponding to the operation in step S401 of the image reading apparatus 1. When the setting data reading request is issued, the determination result in step S601 is YES, and the process goes to step S602. When the setting data reading request is not issued, the determination result in step S601 is NO, and the process goes to step S604, which is indicated as "C" and continues to "C" of FIG. 16B.

The RFID tag 30 reads the RFID tag data from the storing area 34a of the EEPROM 24 in step S602, and sends the RFID tag data to the image reading apparatus 1 in step S603, and the process of the RFID tag 30 goes to step S604.

On receiving the RFID tag data, the image reading apparatus 1 performs the operation in step S402.

In step S402, it is determined whether the setting data is sent by the RFID tag 30 responding to the setting data reading request. The determination depends on an operation performed by the RFID tag 30 in step S603, which will be described later. When the setting data is sent by the RFID tag 30, the determination result in step S402 is YES, and the process goes to step S403.

In step S403, the data readout flag Fr is set to "1", and the process goes to step S404.

In step S404, the RFID tag data received in step S402 is stored in the storing area 4b shown in FIG. 10. After performing step S404, the operation flow of the RFID tag data reading process is terminated.

When the setting data is sent by the RFID tag 30, the determination result in step S402 is NO, the process goes to step S405.

In step S405, the data readout flag Fr is set to "0". After performing step S405, the operation flow of the RFID tag data reading process is completed.

In FIG. 16B, the image reading apparatus 1 starts the copy operation data writing process with step S501.

In step S501, the image reading apparatus 1 issues an ID data writing request to the RFID tag 30, and the RFID tag 30 receives in step S604.

In step S604, it is determined whether the RFID tag 30 receives the ID data writing request issued by the image reading apparatus 1 corresponding to the operation in step S501 of the image reading apparatus 1. When the ID data writing request is not issued, the determination result in step S604 is NO, the process goes back to step S601 and the processes from step S601 to step S604 repeat until the ID data writing request is received by the RFID tag 30. When the ID data writing request is issued, the determination result in step S604 is YES, the process goes to step S605.

In step S605, the RFID tag 30 responds the ID data writing request issued by the image reading apparatus 1 and permits to write the ID data. On receiving the response from the RFID tag 30, the image reading apparatus performs the operation in step S502. After step S605, the process of the RFID tag 30 goes to step S606.

In step S502, it is determined whether the ID data writing permission is sent by the RFID tag 30. The determination depends on an operation performed by the RFID tag 30 in step S605, which will be described later. When the ID data writing permission is sent by the RFID tag 30, the determination result in step S502 is YES, and the process goes to step S503.

In step S503, the local apparatus ID data is read out from the storing area 5d shown in FIG. 9, and the process goes to step S504.

In step S504, the image reading apparatus 1 sends the local apparatus ID data to the RFID tag 30, and the RFID tag 30 receives the local apparatus ID data in step S606.

After step S504, the operation flow of the copy operation data writing process is completed.

When the ID data writing permission is not sent by the RFID tag 30, the determination result in step S502 is NO, and the operation flow of the copy operation data writing process is completed.

In step S606 performed by the RFID tag 30, it is determined whether the RFID tag 30 receives the local apparatus ID data from the image reading apparatus 1 corresponding to the operation in step S504 of the image reading apparatus 1. When the local apparatus ID data is not received, the determination result is NO, and the process goes back to step S601 and the processes from step S601 to step S606 repeat until the local apparatus ID data is received by the RFID tag 30. When the local apparatus ID data is received, the determination result is YES, the process goes to step S607.

In step S607, the received local apparatus ID data is written as the "ID data of apparatus under copy operation", which is one of the rewritable data of the RFID tag data shown in FIG. 12. After step S607, the process goes back to step S601.

As described above, by communicating with the RFID tag 30, the RFID tag data of the RFID tag 30 included in the object material 40 may be read out by the image reading apparatus 1 through the RFID tag data reading process, and the local apparatus ID data of the image reading apparatus 1 may be stored in the RFID tag 30 as the ID data of apparatus under copy operation.

The local apparatus ID data stored in the RFID tag 30 may be referred to, if necessary, when the RFID tag 30 included in the object material 40 is read by a RFID tag reader provided in a bank, for example. When the above-described object material 40 is a passbook, for example, the local apparatus ID data may effectively be utilized to temporarily suspend a withdrawal of money from the account of the passbook and identify a person who would produce copy-prohibited documents.

As an alternative, the ID data of the RFID tag 30 may be obtained in the RFID tag data reading process to distinguish the RFID tag 30 from other RFID tags, and the thus obtained ID data may be sent through the copy operation data writing process. By performing the above-described actions, the RFID tag data of the RFID tag 30 may be compared with the received ID data, and when the RFID tag data and the received ID data are matched, the ID data of apparatus under copy operation may be written, thereby a miswriting of the ID data may be prevented.

Figure 17:
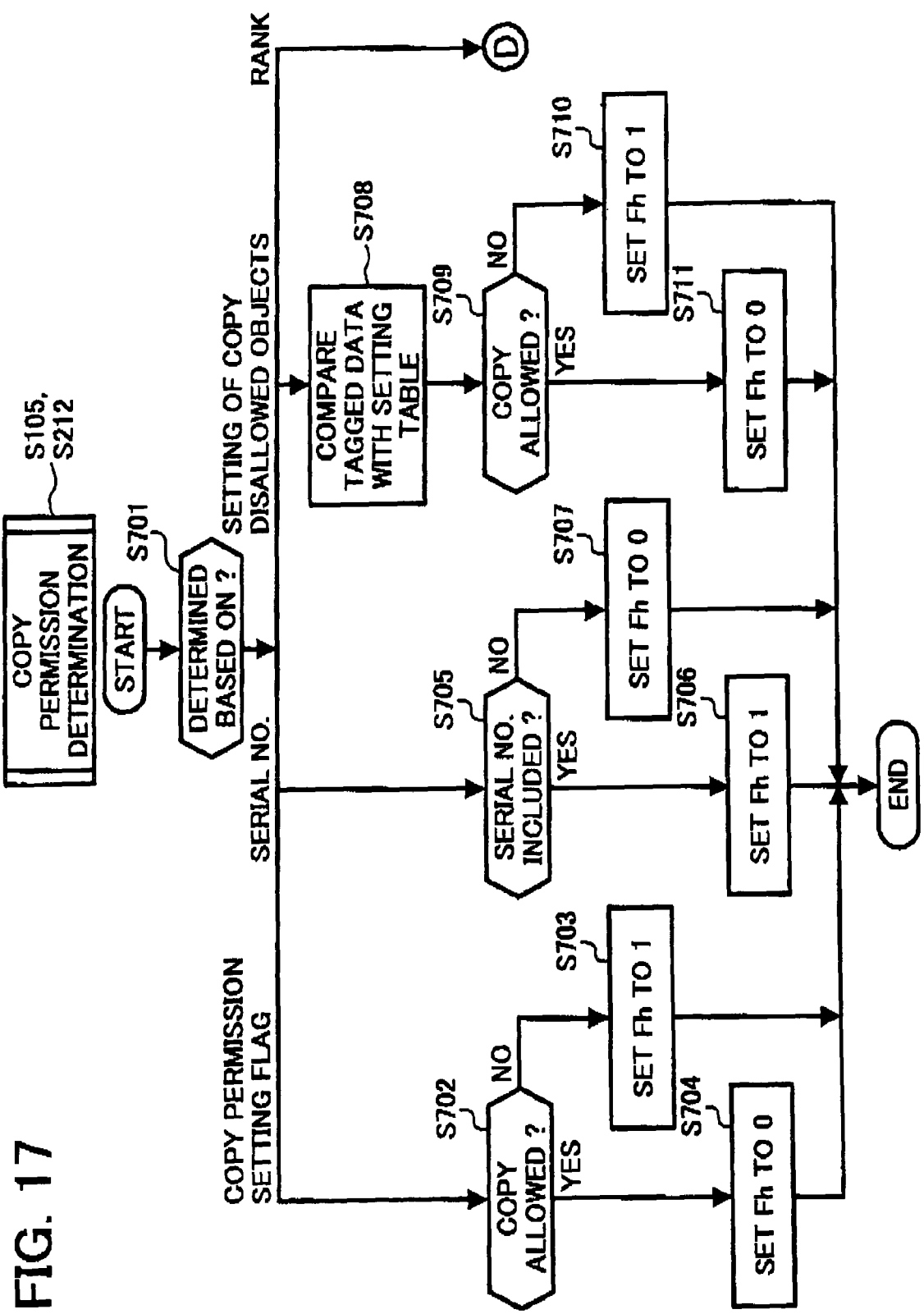
FIG. 17 is a flowchart showing detailed operations of a copy permission determining process.

Referring to FIG. 17, a detailed flowchart of the copy permission determining process corresponding to step S105 of FIG. 13 and step S212 of FIG. 14 is described.

When the copy permission determining process starts in the image reading apparatus 1, the process goes to step S701.

In step S701, it is determined, based on the copy permission determining flag Fj stored in the storing area 5a shown in FIG. 9, whether the copy permission determination is made by reference to "copy permission setting flag", "serial number", "setting of disallowed copy objects", or "rank values".

When the "copy permission setting flag" is selected, the process goes to step S702.

In step S702, it is determined, based on the copy permission setting flag Fc shown in FIG. 12, whether the object material is allowed, that is, Fc is set to "0", or disallowed, that is, Fc is set to "1", to copy. The copy permission setting flag Fc is one of the RFID tag data retrieved from the RFID tag 30 and stored in the storing area 4b of FIG. 10. When the object material is disallowed to copy, that is, when the copy permission setting flag Fc is set to "1", the determination result is NO, and the process goes to step S703. In step S703, the copy permission determination result flag Fh is set to "1", and the operation flow of the copy permission determining process is completed.

When the object material is allowed to copy, that is, when the copy permission setting flag Fc is set to "0", the determination result is YES, and the process goes to step S704. In step S704, the copy permission determination result flag Fh is set to "0", and the operation flow of the copy permission determining process is completed.

With the operations described above, the copy permission, "copy allowed" or "copy disallowed", may be determined according to the setting of the copy permission setting flag Fc of the RFID tag 30 included in the object material 40.

When the "serial number" is selected, the process goes to step S705.

In step S705, it is determined, based on the serial number, whether the object material includes the serial number. The serial number is one of the RFID tag data retrieved from the RFID tag 30 and stored in the storing area 4b of FIG. 10. When the object material includes the serial number, the determination result is YES, and the process goes to step S706. In step S706, the copy permission determination result flag Fh is set to "1", and the operation flow of the copy permission determining process is completed.

When the object material does not include the serial number, the determination result is NO, and the process goes to step S707. In step S707, the copy permission determination result flag Fh is set to "0", and the operation flow of the copy permission determining process is completed.

With the operations described above, the object material 40 with the RFID tag 30 having the serial number may be determined as a material prohibited to copy, such as a banknote, and may be disallowed to copy. Thus, the copy permission, "copy allowed" or "copy disallowed", may be determined based on the existence of the serial number.

When the "setting of disallowed copy objects" is selected, the process goes to step S708.

In step S708, types of data specified as the tagged material type data are compared with the setting table of disallowed copy objects stored in the storing area 5c shown in FIG. 9. The tagged material type data is one of the RFID tag data retrieved from the RFID tag 30 and stored in the storing area 4b shown in FIG. 10. After step S708, the process goes to step S709.

In step S709, it is determined, based on the results of step S709, whether the copying of the object material is allowed or disallowed. When the copying of the object material is disallowed, the determination result in step S709 is NO, and the process goes to step S710. In step S710, the copy permission determination result flag Fh is set to "1", and the operation flow of the copy permission determining process is completed.

When the copying of the object material is allowed, the determination result in step S709 is YES, and the process goes to step S711. In step S711, the copy permission determination result flag Fh is set to "0", and the operation flow of the copy permission determining process is completed.

With the operations described above, the object material 40 having a type specified by the RFID tag 30 included in the object material 40 may be determined as a copy-prohibited document to copy or not in the local apparatus. When the object material 40 is disallowed to copy, the copy permission may be "copy disallowed", and when the object material 40 is allowed to copy, the copy permission may be "copy allowed".

Figure 18:
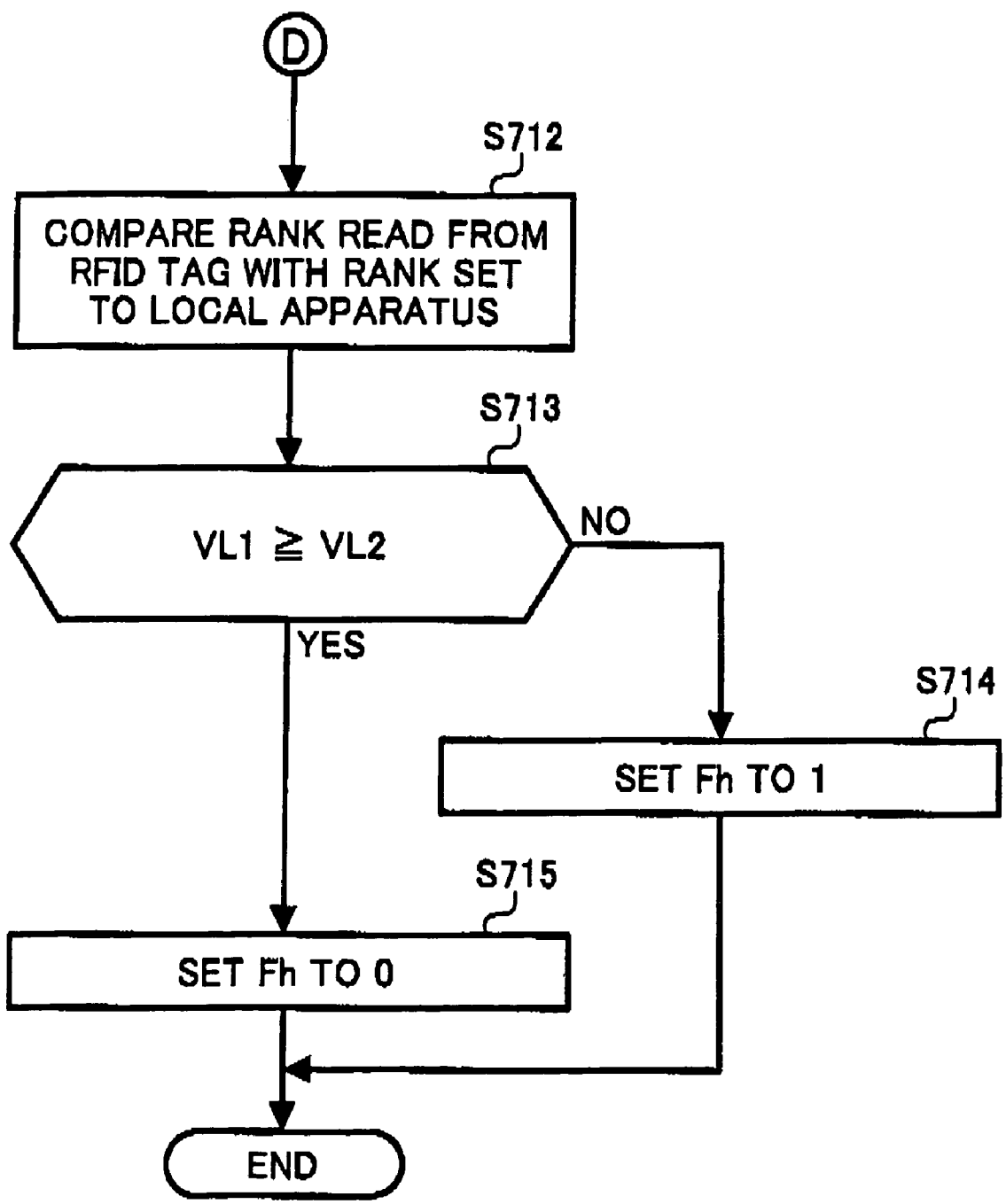
FIG. 18 is a flowchart showing detailed operations of the copy permission determining process of FIG. 17, focusing on the process with a rank value.

When the "rank values" is selected, the process goes to step S712 shown in FIG. 18, which is indicated as "D" in FIG. 17.

Referring to FIG. 18, a detailed flowchart of operations when the "rank values" is selected in FIG. 17 is described. As previously described, when the "rank values" is selected in step S701 of FIG. 17, the process goes to step S712.

In step S712, the rank value VL2 which is one of the RFID tag data retrieved from the RFID tag 30 and stored in the storing area 4b of FIG. 10 is compared with the rank value VL1 stored in the stored area 5b of FIG. 9, and the process goes to step S713.

In step S713, it is determined whether the rank value VL1 is equal to or greater than the rank value VL2, that is, whether a rank of copy permission of the object material stored in the storing area 5b of the EEPROM 5 of FIG. 9 is equal to or superior to a rank stored in the fixed data of the storing area 34a of the EEPROM 34 of FIG. 12. For example, a rank value VL1 of "1" is greater than a rank value VL2 of "4". When the rank value VL1 is smaller than the rank value VL2, that is, when the rank of copy permission of the object material stored in the storing area 5b is not equal to or superior to the rank stored in the fixed data of the storing area 34a, the determination result in step S713 is NO, and the process goes to step S714. In step S714, the copy permission determination result flag Fh is set to "1", and the operation flow of the copy permission determining process is completed.

When the rank value VL1 is equal to or greater than the rank value VL2, that is, when the rank of copy permission of the object material stored in the storing area 5b is equal to or superior to the rank stored in the fixed data of the storing area 34a, the determination result in step S713 is YES, and the process goes to step S715. In step S715, the copy permission determination result flag Fh is set to "0", and the operation flow of the copy permission determining process is completed.

With the operations described above, the copy permission, the copy permission, "copy allowed" or "copy disallowed", may be determined according to the result of the comparison of the rank value VL1 set in the local apparatus with the rank value VL2 set in the RFID tag 30.

Figure 19:
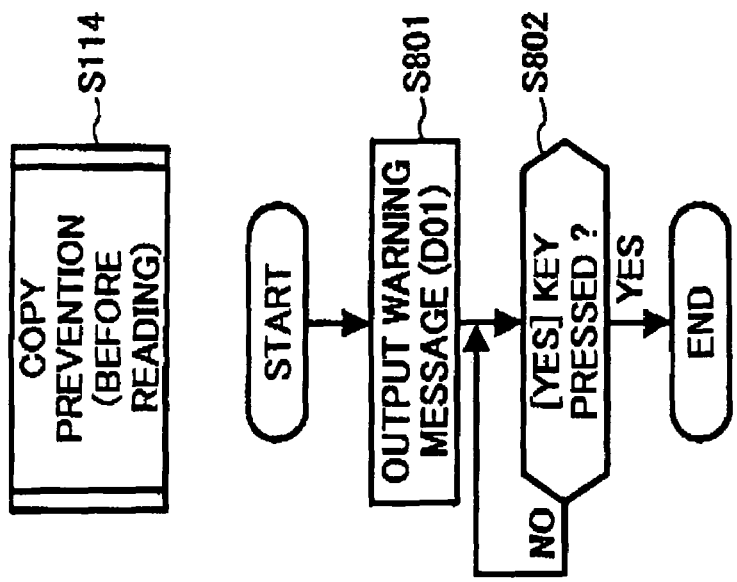
FIG. 19 is a flowchart showing detailed operations of a copy prevention process.

Referring to FIG. 19, a detailed flowchart of the copy prevention process corresponding to step S114 of FIG. 13 is described. When the copy prevention process starts in the image reading apparatus 1, the process goes to step S801.

Figure 23:
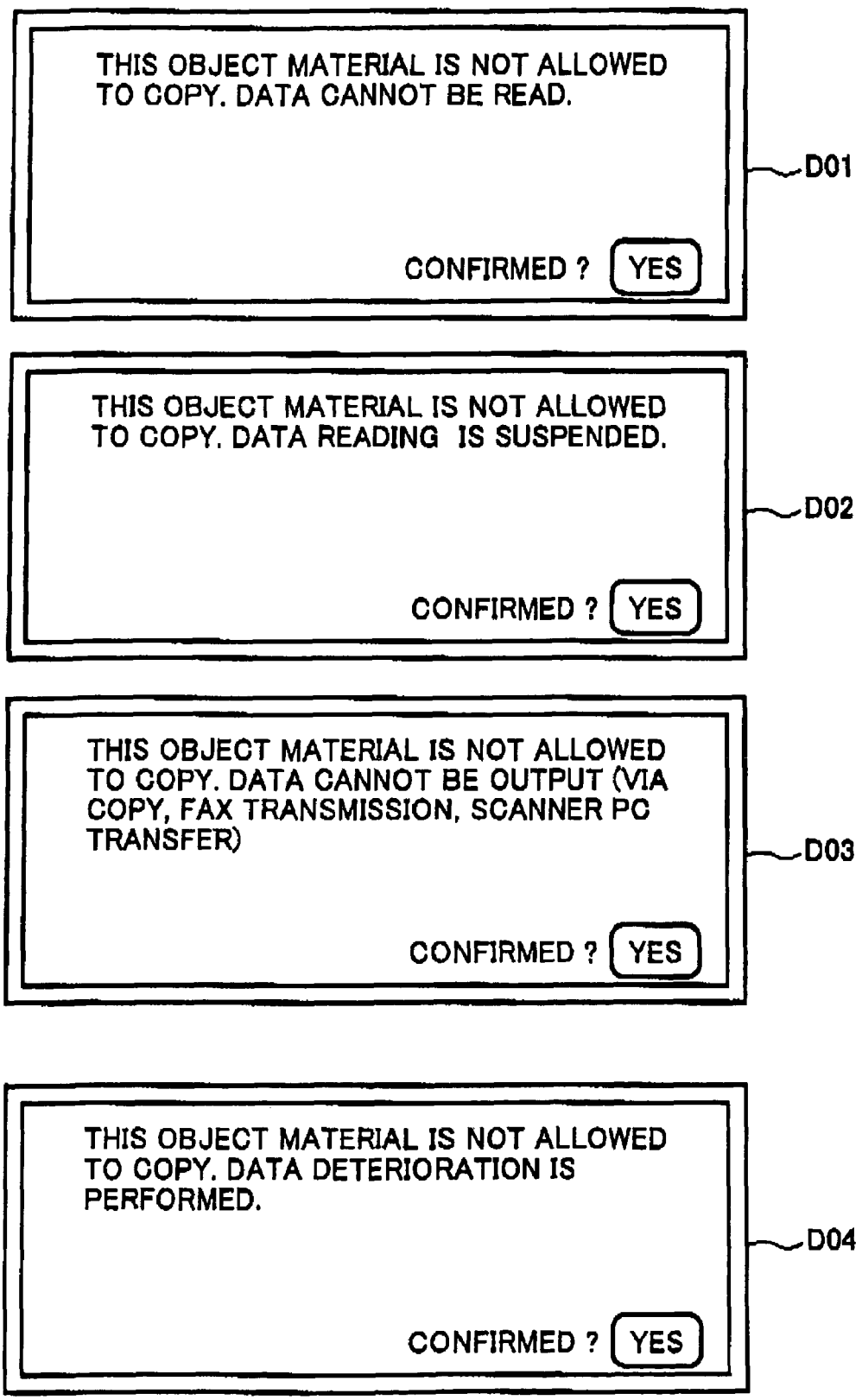
FIG. 23 is a diagram showing message displays according to the flowcharts of FIGS. 19 to 22.

In step S801, a warning message included in a message display D01 which is shown in FIG. 23 is output to display on the screen 9i of the operation display unit 9, and the process goes to step S802.

The warning message of the message display D01 says, "THIS OBJECT MATERIAL IS NOT ALLOWED TO COPY. DATA CANNOT BE READ," and encourages a user to confirm the message and press the [YES] key 9b.

The warning message is used as a means of a copy disallowed material notifying mechanism to notify a user that the object material is disallowed to copy. A method of outputting the warning message is not limited to the method of outputting the above-described warning message of the message display D01. As an alternative, a warning message may be output in a manner of audio warning using sound, photonic warning using LEDs instead of the operation display unit 9, or other similar user-recognizable warning. By outputting the warning message, the user may recognize the copy-prohibited document has nearly been read. The same effect may be exerted by outputting other warning messages which will be described below.

In step S802, it is determined whether the [YES] key is pressed. When the [YES] key is not pressed, the determination result in step S802 is NO, and the process of step S802 repeats until the [YES] key is pressed. When the [YES] key is pressed, the determination result in step S802 is YES, and the process goes back to step S101 of FIG. 13.

With the operations described above, the object material determined as "copy disallowed" may not be read. Thereby, reproduction of the copy-prohibited image data may be prevented. After step S802, the process completes.

Figure 20:
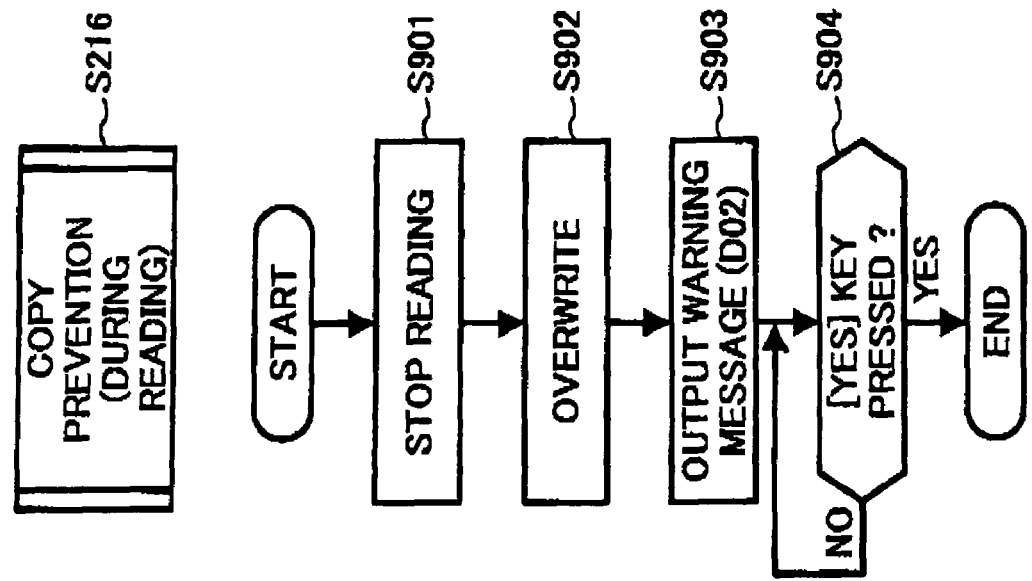
FIG. 20 is a flowchart showing detailed operations of the copy prevention process following steps different from those of FIG. 19.

Referring to FIG. 20, a detailed flowchart of the copy prevention process corresponding to step S216 of FIG. 14 is described. When the copy prevention process starts in the image reading apparatus 1, the process goes to step S901.

The CPU 2 stops reading the object material 40 to prevent further reading a copy-prohibited image data in step S901, and data previously read and stored in the RAM 4 is deleted by overwriting in step S902.

Generally, image data stored in the RAM 4 is deleted so that a reusable memory area obtained due to the deletion may be used for storing new data. An explicit deletion of the contents of the image data, in which the values of the entire pixels of the image data are overwritten to "0", is an unnecessary process for data reading operations of the image reading apparatus 1. However, the image data read until the data reading operations are suspended in step S901 is found out to be a copy-prohibited image data, and are overwritten to delete in step S902. By overwriting the image data, the copy-prohibited image data stored in the storing data of the RAM 4 may be deleted, which can prevent that the copy-prohibited image data may be misused in an illegal manner.

Depending on types of image reading apparatuses, a portion of the storing area of the RAM 4 may be provided a memory card which is detachable from the image reading apparatuses. In a case where the copy-prohibited image data is stored in the storing area of the memory card, the image data may easily be read in an illegal manner. Therefore, it is highly effective to delete the copy-prohibited image data by overwriting in step S902. When the image data is stored in a HDD instead of the RAM 4, the same effect may be exerted on deleting the copy-prohibited image data.

After step S902, a warning message included in a message display D02 which is shown in FIG. 23 is output to display on the screen 9i of the operation display unit 9 in step S903, and the process goes to step S904.

The warning message of the message display D02 says, "THIS OBJECT MATERIAL IS NOT ALLOWED TO COPY. DATA READING IS SUSPENDED" and encourages a user to confirm the message and press the [YES] key 9b.

In step S904, it is determined whether the [YES] key is pressed. When the [YES] key is not pressed, the determination result in step S904 is NO, and the process of step S904 repeats until the [YES] key is pressed. When the [YES] key is pressed, the determination result in step S904 is YES, the process completes.

With the operations described above, the object material determined as "copy disallowed" during the image reading operation may be suspended to read, and the process goes back to step S101. Thereby, reproduction of the copy-prohibited image data may be prevented.

Figure 21:
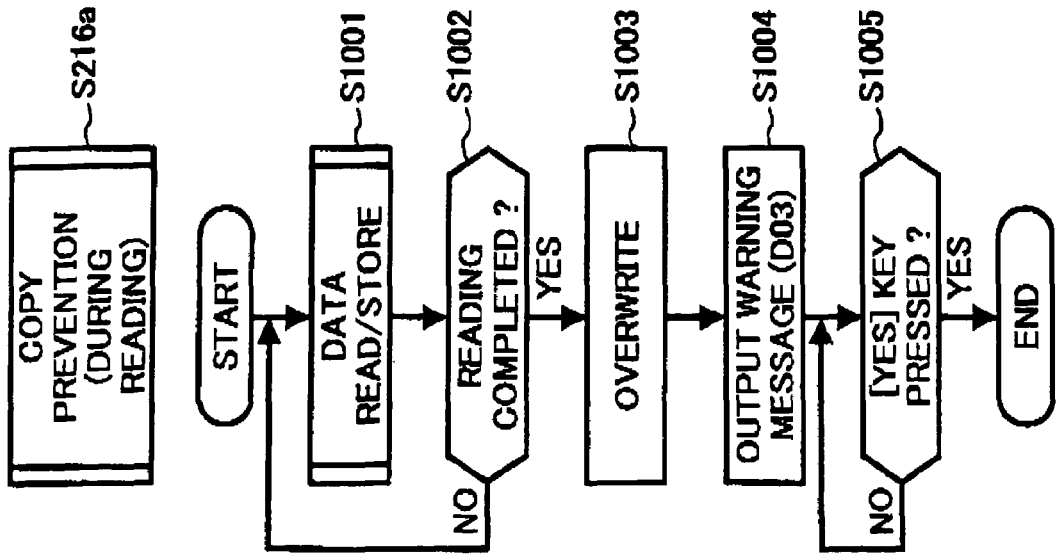
FIG. 21 a flowchart showing detailed operations of the copy prevention process following steps different from those of FIG. 19 and FIG. 20.

Referring to FIG. 21, another detailed flowchart of the copy prevention process step corresponding to step S216 of FIG. 14 is described. The copy prevention process performed in step S216a in this case starts with step S1001 corresponding to step S202 of FIG. 14.

In step S1001, the image data included in the object material 40 is read, and is subsequently stored in the RAM 4. After step S1001, the process goes to step S1002.

In step S1002, it is determined whether the reading of the RFID tag data is completed. When the reading of the RFID tag data is not completed, the determination result in step S1002 is NO, and the process goes back to step S1001. When the reading of the RFID tag data is completed, the determination result in step S1002 is YES, and the process goes to step S1003.

In step S1003, the image data previously stored in the RAM 4 is deleted by overwriting, thereby the copy-prohibited image data stored in the storing area of the RAM 4 may be deleted, which can prevent that the copy-prohibited document, such as banknotes, may be misused in an illegal manner.

After step S1003, the process goes to step S1004. In step S1004, a warning message included in a message display D03 which is shown in FIG. 23 is output to display on the screen 9i of the operation display unit 9, and the process goes to step S1005.

The warning message of the message display D03 says, "THIS OBJECT MATERIAL IS NOT ALLOWED TO COPY. DATA CANNOT BE OUTPUT VIA COPY, FAX TRANSMISSIN, SCANNER PC TRANSFER," and encourages a user to confirm the message and press the [YES] key 9b.

In step S1005, it is determined whether the [YES] key is pressed. When the [YES] key is not pressed, the determination result in step S1005 is NO, and the process of step S1005 repeats until the [YES] key is pressed. When the [YES] key is pressed, the determination result in step S1005 is YES, and the process completes.

With the operations described above, the object material determined as "copy disallowed" during the image reading operation may continuously be read. However, the image data read as described above may not be output, and the process goes back to step S101. Thereby, reproduction of the copy-prohibited image data may be prevented.

Referring to FIG. 22, another detailed flowchart of the copy prevention process corresponding to step S216 of FIG. 14 is described. The copy prevention process step S216b in this case starts with step S1101 corresponding to step S202 of FIG. 14.

In step S101, the image data included in the object material 40 is read, and is subsequently stored in the RAM 4. After step S1101, the process goes to step S1102.

In step S1102, it is determined whether the reading of the RFID tag data is completed. When the reading of the RFID tag data is not completed, the determination result in step S1102 is NO, and the process goes back to step S1101. When the reading of the RFID tag data is completed, the determination result in step S1102 is YES, and the process goes to step S1103.

In step S1103, a warning message included in a message display D04 which is shown in FIG. 23 is output to display on the screen 9i of the operation display unit 9, and the process goes to step S1104.

The warning message of the message display D04 says, "THIS OBJECT MATERIAL IS NOT ALLOWED TO COPY. DATA DETERIORATION IS PERFORMED," and encourages a user to confirm the message and press the [YES] key 9b. Although the warning message of the message display D04 informs the image data deterioration process has been performed, an actual process may be performed in step S11105.

In step S1104, it is determined whether the [YES] key is pressed. When the [YES] key is not pressed, the determination result in step S1104 is NO, and the process of step S1104 repeats until the [YES] key is pressed. When the [YES] key is pressed, the determination result in step S1104 is YES, and the process goes to step S1105.

As previously described, the image data deterioration process is performed in step S1105. According to the process, the image reading apparatus 1 may have an alternative structure such that the [NO] key 9c may stop outputting the deteriorated image data. With the above-described structure, the copy-prohibited image data is deleted by overwriting, thereby recording media such as transfer sheets may be saved during the "COPY" mode, unnecessary images to be output or displayed into the destination facsimile machine may be prevented during the "FAX" mode, and useless transfer or needless display to the destination PC may be avoided during the "SCAN" mode.

In step S1105, the image data deterioration process is performed, and the thus deteriorated image data is output in step S1106. After step S1106, the process completes.

Detailed processes of image outputting in step S106 are shown in FIG. 15. In step S1106, when the original image data remains in the storing area of the RAM 4, the original image data is deleted by overwriting, thereby preventing output of illegally produced image data.

Figure 24A:
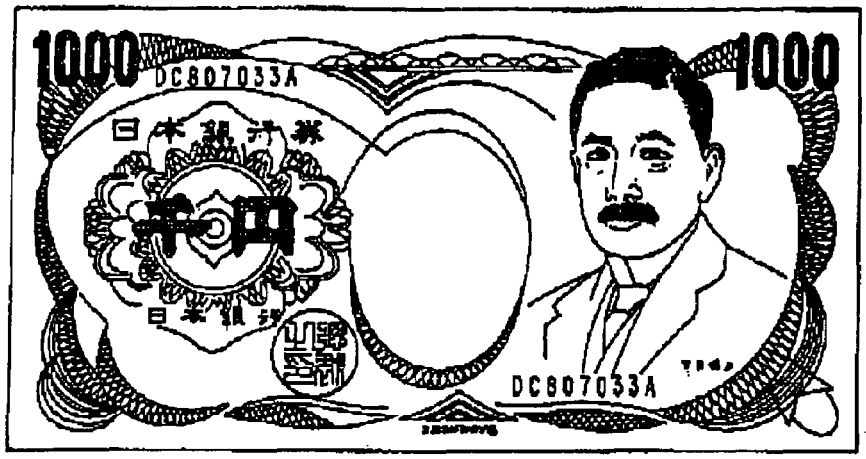
FIG. 24A is an object material before an image data deterioration process is performed.
Figure 24B:
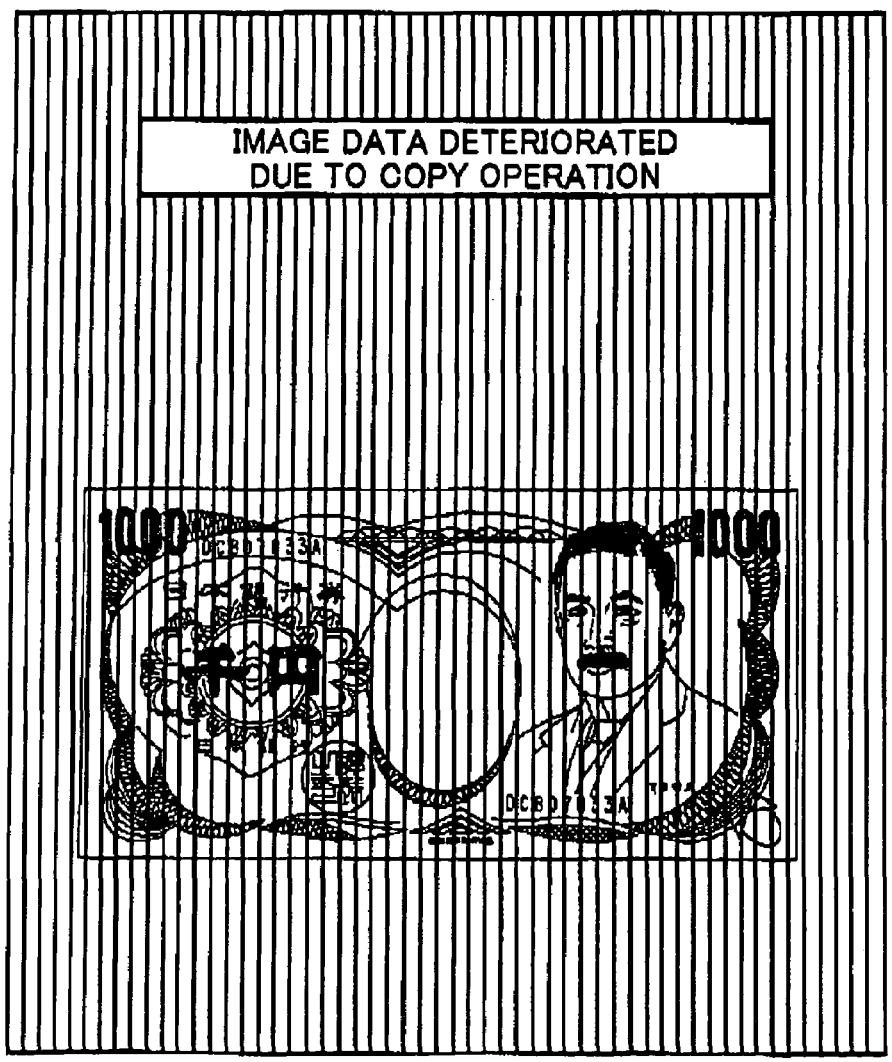
FIG. 24B is a printed image data of the object material after the image data deterioration process is performed.

FIG. 24A shows an object material which is read by the image reading apparatus 1 in step S1101 of FIG. 22. The object material is a Japanese currency banknote having image data disallowed to counterfeit. FIG. 24B shows a deteriorated image of the object material of FIG. 24A. The image data of the object material of FIG. 24A is read in step S1101, is then deteriorated in step S1105, and is output as the deteriorated image in step S1106.

As shown in FIG. 24B, a plurality of vertical lines are superimposed on the image to deteriorate the image to the extent that the original image of the object material can be recognized. The original image may reasonably be deteriorated to prevent counterfeiting. Therefore, instead of using the plurality of vertical lines, other image data deterioration processes may be used. For example, image data deterioration processes superimposing a plurality of horizontal lines, superimposing a plurality of diagonal lines, overlaying half-tone dot meshes, degrading half-tone level, superimposing noises, changing colors may be performed for deteriorating an original image of a copy-disallowed object material.

Further, the deteriorated image includes a message, "IMAGE DATA DETERIORATED DUE TO COPY OPERATION", to clearly inform users of the change of the image data in quality when the image data is printed on a recording sheet or displayed on a screen. As an alternative, the message may mention that the image data deterioration is performed because the object material is an image prohibited to copy.

As described above, when the object material is determined to be disallowed to copy during the image reading operation, the image reading apparatus 1 continues to read the object material, performs the image data deterioration process to the read image data of the object material, and outputs the deteriorated image data, thereby preventing misuse of illegally produced images.

Figure 25:
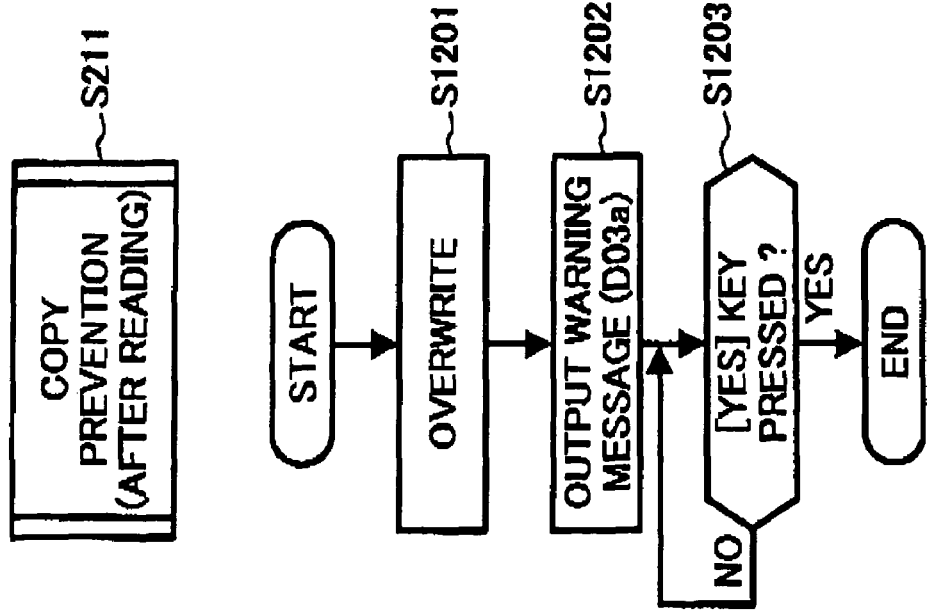
FIG. 25 is a flowchart showing detailed operations of the copy prevention process.

Referring to FIG. 25, a detailed flowchart of the copy prevention process corresponding to step S211 of FIG. 14 is described. When the copy prevention process in this case starts in the image reading apparatus 1, the process goes to step S1201.

In step S1201, the image data previously stored in the RAM 4 in step S202 of FIG. 14 is deleted by overwriting, thereby the copy-prohibited image data stored in the storing area of the RAM 4 may be deleted, which can prevent that the copy-prohibited document, such as banknotes, may be misused in an illegal manner.

Figure 27:
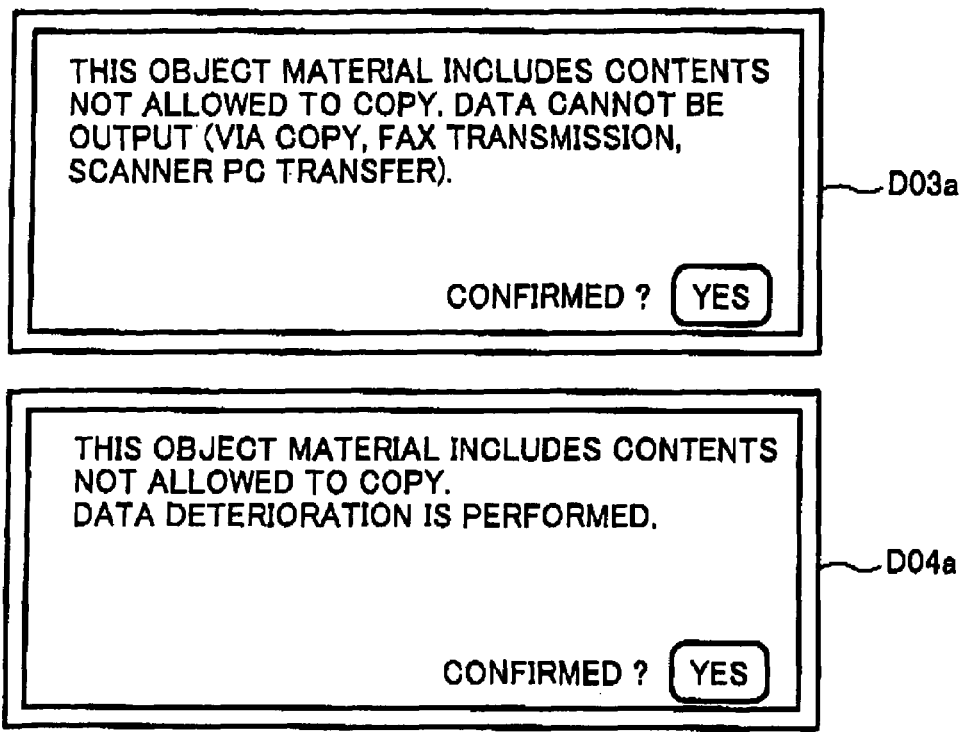
FIG. 27 is a diagram showing message displays according to the flowcharts of FIGS. 25 and 26.

After step S1201, the process goes to step S1202. In step S1202, a warning message included in a message display D03a which is shown in FIG. 27 is output to display on the screen 9i of the operation display unit 9, and the process goes to step S1203.

The warning message of the message display D03a says, "THIS OBJECT MATERIAL INCLUDES CONTENTS NOT ALLOWED TO COPY. DATA CANNOT BE OUTPUT VIA COPY, FAX TRANSMISSIN, SCANNER PC TRANSFER," and encourages a user to confirm the message and press the [YES] key 9b.

In step S1203, it is determined whether the [YES] key is pressed. When the [YES] key is not pressed, the determination result in step S1203 is NO, and the process of step S1203 repeats until the [YES] key is pressed. When the [YES] key is pressed, the determination result in step S1203 is YES, and the process completes.

With the operations described above, when the object material is determined as "copy allowed" in the copy permission determining process according to the RFID tag data read from the RFID tag 30, the object material may be judged as "copy disallowed" according to recognition of the image data. In this case, the process completes without outputting the image data, thereby reproduction of the copy-prohibited image data may surely be prevented.

Referring to FIG. 26, another detailed flowchart of the copy prevention process corresponding to step S211 of FIG. 14 is described. The copy prevention process step S211a in this case starts with step S1301.

In step S1301, a warning message included in a message display D04a which is shown in FIG. 27 is output to display on the screen 9i of the operation display unit 9, and the process goes to step S1302.

The warning message of the message display D04a says, "THIS OBJECT MATERIAL INCLUDES CONTENTS NOT ALLOWED TO COPY. DATA DETERIORATION IS PERFORMED," and encourages a user to confirm the message and press the [YES] key 9b. Although the warning message of the message display D04a informs the image data deterioration process has been performed, an actual process may be performed in step S1303.

In step S1302, it is determined whether the [YES] key is pressed. When the [YES] key is not pressed, the determination result in step S1302 is NO, and the process of step S1302 repeats until the [YES] key is pressed. When the [YES] key is pressed, the determination result in step S1302 is YES, and the process goes to step S1303.

As previously described, the image data deterioration process is performed in step S1303. According to the process, the image reading apparatus 1 may have an alternative structure such that the [NO] key 9c may stop outputting the deteriorated image data. With the above-described structure, the copy-prohibited image data is deleted by overwriting, thereby recording media such as transfer sheets may be saved during the "COPY" mode, unnecessary images to be output or displayed into the destination facsimile machine may be prevented during the "FAX" mode, and useless transfer or needless display to the destination PC may be avoided during the "SCAN" mode.

In step S1303, the image data deterioration process is performed, and the thus deteriorated image data is output in step S1304. The image data deterioration process performed in step S1303 is same as that performed in step S1105 of FIG. 22. After step S1304, the process completes.

Detailed processes of image outputting in step S1304 are shown in FIG. 15. In step S1303, when the original image data remains in the storing area of the RAM 4, the original image data is deleted by overwriting, thereby preventing output of illegally produced image data.

With the operations described above, when the object material is determined as "copy allowed" in the copy permission determining process according to the RFID tag data read from the RFID tag 30, the object material may be judged as "copy disallowed" according to recognition of the image data. In this case, the process goes back to step S101 without outputting the image data, thereby reproduction of the copy-prohibited image data may surely be prevented.

Figure 28:
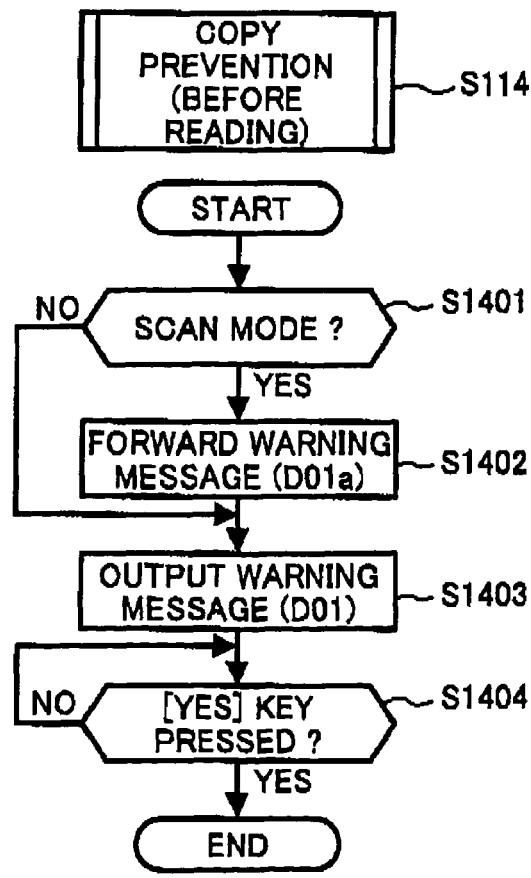
FIG. 28 is a modified flowchart showing operations of the copy prevention process alternative to that of FIG. 19.

Referring to FIG. 28, a modified flowchart of the copy prevention process step S114a alternative to the copy prevention process S114 of FIG. 19 is described. The flowchart of FIG. 28 is similar to that of FIG. 19, except steps S1401 and S1402.

In step S1401, it is determined whether the "scan mode" is selected as the image output mode, based on the image data output mode setting flag Fout stored in the storing area 4e of FIG. 10. When the "scan mode" is not selected, the determination result in step S1401 is NO, and the process goes to step S1403 which corresponds to step S801 shown in FIG. 19. When the "scan mode" is selected, the determination result in step S1401 is YES, and the process goes to step S1402.

Figure 29:
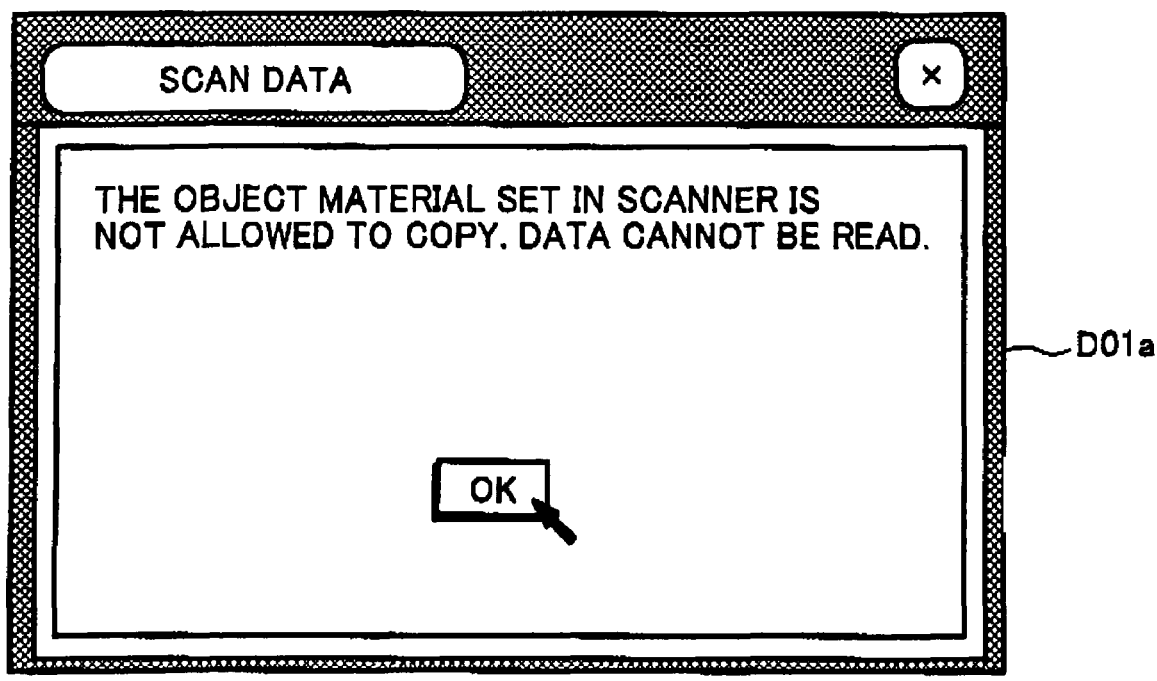
FIG. 29 is a diagram showing a message display appearing on a screen of a personal computer corresponding to the copy prevention process shown in FIG. 28.

In step S1402, a warning message D01a which is shown in FIG. 29 is transferred via the LAN 100 to the source PC 101 which issues the instruction to start scanning the image data in step S109, and the process goes to step S1403 which corresponds to step S801 shown in FIG. 19.

In step S1403, a warning message included in a message display D01a (see FIG. 29) is output to display on the screen 9i of the operation display unit 9, and the process goes to step S1404 which corresponds to step S802 shown in FIG. 19.

In step S1404, it is determined whether the [YES] key is pressed. When the [YES] key is not pressed, the determination result in step S1404 is NO, and the process of step S1404 repeats until the [YES] key is pressed. When the [YES] key is pressed, the determination result in step S1404 is YES, and the process completes.

Referring to FIG. 29, a display with the warning message of the message display D01a is described. The warning message D01a, "THE OBJECT MATERIAL SET IN SCANNER IS NOT ALLOWED TO COPY. DATA CANNOT BE READ", is transferred to the source PC 101 in step S1402. "SCANNER" in the warning message D01a represents the image reading apparatus 1.

With the operations described above, an operator of the source PC located away from the image reading apparatus 1 may be informed that the object material set in the image reading apparatus 1 is not read because the object material is disallowed to copy. Instead of transferring the warning message D01a, it is substantially effective to send data indicating that the object material is disallowed to copy to a PC which generates the contents of the message display D01a.

Modifications of operation flows are not limited to the flowchart of FIG. 19, and may be applied to those of FIGS. 20, 21, 22, 25 and 26, to exert same effects as the above-described figures.

As previously described, the exemplary embodiment of the present invention includes the structure that the RFID tag 30 previously stores necessary data for determining whether an object material is allowed or disallowed to copy, thereby the image reading apparatus 1 communicating with the RFID tag 30 can obtain the RFID tag data by reading the RFID tag 30. As an alternative, the present invention may be applied to a structure such that a fixed ID which uniquely identifies the RFID tag 30 is read from the RFID tag 30, and other data corresponding to the fixed ID of the RFID tag 30, such as various data for the copy permission determining process, are read and written according to the fixed ID.

To read and write the data corresponding to the fixed ID, the image reading apparatus 1 is connected via the LAN 100 to a network such as the Internet 300. The image reading apparatus 1 sends inquiry to a server managing the RFID tag data for the fixed ID, so that the image reading apparatus 1 may read the related data, and sends a request to the server for writing the "ID data of apparatus under copy operation" with the fixed ID.

In the present invention, mechanisms controlled by the CPU 2 may have a dedicated hardware structure.

Numerous additional modifications and variations are possible in light of the above teachings. It is therefore to be understood that within the scope of the appended claims, the disclosure of this patent specification may be practiced otherwise than as specifically described herein.

The present application claims priority under 35 U.S.C. §119 to Japanese Patent Application No. 2003-323870, filed on Sep. 17, 2003, in the Japanese Patent Office, the entire contents of which are hereby incorporated herein by reference.

The invention claimed is:

1. An image processing apparatus, comprising:
    a copy protection control apparatus including,
        a radio frequency tag data communicating mechanism configured to receive predetermined radio frequency tag data transmitted from a radio frequency tag attached to an object material, said predetermined radio frequency tag data including a serial number,
        a storage unit configured to store a copy permission determining flag, and
        a copy authorization determining mechanism configured to determine whether reproduction of the object material is authorized, based on the radio frequency tag data received by the radio frequency tag data communicating mechanism and the copy permission determining flag;

an image data reading mechanism configured to read the object material and to obtain image data of the object material;

an image data outputting mechanism configured to output the image data in a predetermined output mode; and an image data reading controlling mechanism configured to control the image data reading mechanism and the image data outputting mechanism to perform one of a copy output process and a copy prevention process according to a result of determination performed by the copy authorization determining mechanism.

2. The image processing apparatus according to claim 1, wherein, the image data reading controlling mechanism is further configured to cause the image data reading mechanism to read and obtain the image data of the object material and to cause the image data outputting mechanism to output the image data when the copy authorization determining mechanism determines that reproduction of the object material is authorized, and the image data reading controlling mechanism is further configured to perform at least one of a plurality of predetermined copy prevention processes when the copy authorization determining mechanism determines that reproduction of the object material is not authorized.

3. The image processing apparatus according to claim 2, wherein the plurality of predetermined copy prevention processes includes a process in which the image data reading mechanism refrains from reading of the object material, regardless of an input of a predetermined instruction for starting a reading operation of the object material.

4. The image processing apparatus according to claim 2, wherein the plurality of predetermined copy prevention processes includes a process in which the image data reading mechanism suspends and stops a reading operation of the object material and in which the image data outputting mechanism refrains from an outputting operation of the image data of the object material.

5. The image processing apparatus according to claim 2, wherein the plurality of predetermined copy prevention processes includes a process in which the image data outputting mechanism refrains from outputting the image data of the object material obtained and stored in a memory by the image data reading mechanism.

6. The image processing apparatus according to claim 5, wherein the copy authorization determining mechanism is configured to determine whether reproduction of the object material is authorized based on the radio frequency tag data received by the radio frequency tag communicating mechanism and based on a result of a predetermined image recognition processing with respect to the image data of the object material obtained and stored in the memory by the image data reading mechanism.

7. The image processing apparatus according to claim 5, wherein the plurality of predetermined copy prevention processes includes a process in which the image reading controlling mechanism overwrites to delete the image data stored in the memory when the copy authorization determining mechanism determines that reproduction of the object material from which the image data is obtained and stored in the memory by the image data reading mechanism is unauthorized.

8. The image processing apparatus according to claim 2, wherein the plurality of predetermined copy prevention processes includes a process in which the image data reading controlling mechanism performs a predetermined image processing to prevent counterfeiting over the image data obtained and stored in a memory by the image data reading mechanism, and the image data outputting mechanism outputs the image data processed by the predetermined image processing.

9. The image processing apparatus according to claim 8, wherein the copy authorization determining mechanism determines whether reproduction of the object material is authorized based on the radio frequency tag data received by the radio frequency tag communicating mechanism and based on a result of a predetermined image recognition processing with respect to the image data of the object material obtained and stored in the memory by the image data reading mechanism.

10. The image processing apparatus according to claim 1, further comprising:

a copy unauthorization notifying mechanism configured to output a notification indicating that reproduction of the object material is unauthorized in a predetermined user-recognizable form when the copy authorization determining mechanism determines that reproduction of the object material is unauthorized.

11. The image processing apparatus according to claim 1, wherein the image data reading mechanism is configured to read the object material placed on a contact glass through a moving member which reciprocates under the contact glass in a sub-scanning direction, and wherein the radio frequency data communicating mechanism includes a transmitter and a receiver, at least one of which is disposed on the moving member.

12. The image processing apparatus according to claim 11, wherein the radio frequency tag data communicating mechanism receives the radio frequency tag data from the radio frequency tag each time the moving member moves a substantially constant distance in a sub-scanning direction.

13. The image processing apparatus according to claim 1, further comprising:

an identification data writing mechanism configured to send and write identification data of the apparatus previously stored in a memory to the radio frequency tag attached to the object material when the copy authorization determining mechanism determines that reproduction of the object material from which the image data is obtained and stored in the memory by the image data reading mechanism is unauthorized.

14. The image processing apparatus according to claim 1, wherein the copy authorization determining mechanism is further configured to authorize reproduction of the object material when a rank value of the object is equal to or greater than a rank value of the image processing apparatus, and to not authorize reproduction of the object material when the rank value of the object is less than the rank value of the image processing apparatus.

15. An image processing apparatus, comprising:

a copy protection control apparatus including, means for receiving predetermined radio frequency tag data transmitted from a radio frequency tag attached to an object material, said data including a serial number, a storage means for storing a copy permission determining flag, and means for determining whether reproduction of the object material is authorized based on the radio frequency tag data received by the means for receiving and the copy permission determining flag;

means for reading the object material and obtaining image data of the object material;

means for outputting the image data in a predetermined output mode; and means for controlling the means for reading and the means for outputting to perform one of a copy output process and a copy prevention process according to a result of the means for determining.

16. The image processing apparatus according to claim 15, wherein the means for controlling, causes the means for reading to read and obtain the image data of the object material and the means for outputting to output the image data when the means for determining determines that reproduction of the object material is authorized, and performs one of a plurality of predetermined copy prevention processes when the means for determining determines that reproduction of the object material is not authorized.

17. The image processing apparatus according to claim 16, wherein the plurality of predetermined copy prevention processes includes a process in which the means for reading refrains from reading of the object material, regardless of an input of a predetermined instruction for starting a reading operation of the object material.

18. The image processing apparatus according to claim 16, wherein the plurality of predetermined copy prevention processes includes a process in which the means for reading suspends and stops a reading operation of the object material and in which the means for outputting refrains from an outputting operation of the image data of the object material.

19. The image processing apparatus according to claim 16, wherein the plurality of predetermined copy prevention processes includes a process in which the means for outputting refrains from outputting the image data of the object material obtained and stored in a memory by the means for reading.

20. The image processing apparatus according to claim 19, wherein the means for determining determines whether reproduction of the object material is authorized based on the radio frequency tag data received by the means for receiving and based on a result of a predetermined image recognition processing with respect to the image data of the object material obtained and stored in the memory by the means for reading.

21. The image processing apparatus according to claim 19, wherein the plurality of predetermined copy prevention processes performed by the means for controlling includes a process in which the means for controlling overwrites to delete the image data stored in the memory when the means for determining determines that reproduction of the object material from which the image data is obtained and stored in the memory by the means for reading is unauthorized.

22. The image processing apparatus according to claim 16, wherein the plurality of predetermined copy prevention processes performed by the means for controlling includes a process in which the means for controlling performs a predetermined image processing to prevent counterfeiting over the image data obtained and stored in a memory by the means for reading, and the means for outputting outputs the image data undergone the predetermined image processing.

23. The image processing apparatus according to claim 22, wherein the means for determining determines whether reproduction of the object material is authorized based on the radio frequency tag data received by the means for receiving and based on a result of a predetermined image recognition processing with respect to the image data of the object material obtained and stored in the memory by the means for reading.

24. The image processing apparatus according to claim 15, further comprising:

means for notifying that reproduction of the object material is unauthorized in a predetermined user-recognizable form when the means for determining determines that reproduction of the object material is unauthorized.

25. The image processing apparatus according to claim 15, wherein the means for reading reads the object material placed on a contact glass through a moving member which reciprocates under the contact glass in a sub-scanning direction, and wherein the means for receiving includes a transmitter and a receiver, at least one of which is disposed on the moving member.

26. The image processing apparatus according to claim 25, wherein the means for receiving receives the radio frequency tag data from the radio frequency tag each time the moving member moves a substantially constant distance in a sub-scanning direction.

27. The image processing apparatus according to claim 15, further comprising:

means for writing identification data of the apparatus previously stored in a memory to the radio frequency tag attached to the object material when the means for determining determines that reproduction of the object material from which the image data is obtained and stored in the memory by the means for reading is unauthorized.

28. A scanner, comprising:

a radio frequency tag data communicating mechanism configured to receive predetermined radio frequency tag data transmitted from a radio frequency tag attached to an object material, said predetermined radio frequency tag data including a serial number, a storage unit configured to store a copy permission determining flag, and a copy authorization determining mechanism configured to determine whether reproduction of the object material is authorized, based on the radio frequency tag data received by the radio frequency tag data communicating mechanism and the copy permission determining flag;

an image data reading mechanism configured to read the object material and to obtain image data of the object material;

an image data outputting mechanism configured to output the image data in a predetermined output mode; and an image data reading controlling mechanism configured to control the image data reading mechanism and the image data outputting mechanism to perform one of a copy output process and a copy prevention process according to a result of determination performed by the copy authorization determining mechanism.

29. A facsimile machine, comprising:

a radio frequency tag data communicating mechanism configured to receive predetermined radio frequency tag data transmitted from a radio frequency tag attached to an object material, said predetermined radio frequency tag data including a serial number, a storage unit configured to store a copy permission determining flag, and a copy authorization determining mechanism configured to determine whether reproduction of the object material is authorized, based on the radio frequency tag data received by the radio frequency tag data communicating mechanism and the copy permission determining flag;

an image data reading mechanism configured to read the object material and to obtain image data of the object material;

an image data outputting mechanism configured to output the image data in a predetermined output mode; and an image data reading controlling mechanism configured to control the image data reading mechanism and the image data outputting mechanism to perform one of a copy output process and a copy prevention process according to a result of determination performed by the copy authorization determining mechanism.

30. A copier, comprising:

a radio frequency tag data communicating mechanism configured to receive predetermined radio frequency tag data transmitted from a radio frequency tag attached to an object material, said predetermined radio frequency tag data including a serial number, a storage unit configured to store a copy permission determining flag, and a copy authorization determining mechanism configured to determine whether reproduction of the object material is authorized, based on the radio frequency tag data received by the radio frequency tag data communicating mechanism and the copy permission determining flag;

an image data reading mechanism configured to read the object material and to obtain image data of the object material;

an image data outputting mechanism configured to output the image data in a predetermined output mode; and an image data reading controlling mechanism configured to control the image data reading mechanism and the image data outputting mechanism to perform one of a copy output process and a copy prevention process according to a result of determination performed by the copy authorization determining mechanism.

31. A multi-functional image forming apparatus, comprising:

a radio frequency tag data communicating mechanism configured to receive predetermined radio frequency tag data transmitted from a radio frequency tag attached to an object material, said predetermined radio frequency tag data including a serial number, a storage unit configured to store a copy permission determining flag, and a copy authorization determining mechanism configured to determine whether reproduction of the object material is authorized, based on the radio frequency tag data received by the radio frequency tag data communicating mechanism and the copy permission determining flag;

an image data reading mechanism configured to read the object material and to obtain image data of the object material;

an image data outputting mechanism configured to output the image data in a predetermined output mode; and an image data reading controlling mechanism configured to control the image data reading mechanism and the image data outputting mechanism to perform one of a copy output process and a copy prevention process according to a result of determination performed by the copy authorization determining mechanism.

* * * * *